US009338626B1

(12) United States Patent
Meredith et al.

(10) Patent No.: US 9,338,626 B1
(45) Date of Patent: May 10, 2016

(54) DETERMINING AN ACCURACY OF A LOCATION DETERMINATION

(71) Applicants: AT&T Intellectual Property I, L.P., Atlanta, GA (US); AT&T Mobility II LLC, Atlanta, GA (US)

(72) Inventors: Sheldon Kent Meredith, Roswell, GA (US); Rick Tipton, Corryton, TN (US); William Cottrill, Canton, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 2 days.

(21) Appl. No.: 14/538,108

(22) Filed: Nov. 11, 2014

(51) Int. Cl.
*H04W 4/22* (2009.01)
*H04W 4/02* (2009.01)

(52) U.S. Cl.
CPC . *H04W 4/22* (2013.01); *H04W 4/02* (2013.01)

(58) Field of Classification Search
CPC ..... H04W 4/22; H04W 76/007; H04W 64/00; H04W 4/02
USPC ...................... 455/404.2, 456.1, 456.5, 456.6
See application file for complete search history.

(56) References Cited

U.S. PATENT DOCUMENTS

| | | | |
|---|---|---|---|
| 5,625,668 A | 4/1997 | Loomis et al. | |
| 6,519,463 B2 | 2/2003 | Tendler | |
| 7,016,478 B2 | 3/2006 | Potorny et al. | |
| 7,274,332 B1 | 9/2007 | Dupray | |
| 7,525,484 B2 | 4/2009 | Dupray et al. | |
| 7,711,375 B2 | 5/2010 | Liu | |
| 7,937,067 B2 | 5/2011 | Maier et al. | |
| 8,082,096 B2 | 12/2011 | Dupray | |
| 8,315,237 B2 | 11/2012 | Berger et al. | |
| 8,442,482 B2 | 5/2013 | Maier et al. | |
| 8,538,374 B1 | 9/2013 | Haimo et al. | |
| 8,755,767 B2 | 6/2014 | Maier et al. | |
| 8,798,647 B1 | 8/2014 | Haney | |
| 2006/0017614 A1* | 1/2006 | Fullerton | G01S 13/42 342/387 |
| 2006/0052115 A1* | 3/2006 | Khushu | G01S 5/0263 455/456.3 |
| 2006/0245570 A1* | 11/2006 | Pfleging | H04M 7/006 379/211.02 |
| 2006/0252998 A1 | 11/2006 | Kimbrell | |
| 2010/0297980 A1 | 11/2010 | Alberth et al. | |

(Continued)

FOREIGN PATENT DOCUMENTS

EP 1835778 B1 11/2008
EP 2403276 A1 1/2012

(Continued)

*Primary Examiner* — Christopher M Brandt
(74) *Attorney, Agent, or Firm* — Baker & Hostetler LLP

(57) ABSTRACT

The accuracy of a location determination mechanism may be determined as compared to another location determination mechanism. Dialing 9-1-1 on a mobile communication device may trigger location determination of the device via a GPS-based mechanism. The location information may be time stamped. The location and time information may be provided to a network. The network may determine the location of the device via network infrastructure. The network may time stamp this second set of locations. The determination of the locations of the device via GPS and via the network infrastructure may occur approximately during the same time frame. The first set of locations and the second set of locations may be time aligned, and the differences between the two sets may be utilized to determine the accuracy of network-infrastructure-based location determination mechanism as compared to the GPS-based location determination mechanism.

20 Claims, 12 Drawing Sheets

(56) References Cited

U.S. PATENT DOCUMENTS

| | | | |
|---|---|---|---|
| 2010/0297981 A1* | 11/2010 | Ballantyne | H04M 1/72536 455/404.2 |
| 2010/0311385 A1 | 12/2010 | Hurwitz | |
| 2011/0244891 A1* | 10/2011 | Ghinamo | G01S 19/20 455/456.6 |
| 2012/0236835 A1* | 9/2012 | Rokusek | G01S 19/14 370/338 |
| 2013/0109414 A1* | 5/2013 | Miyazaki | H04W 4/02 455/457 |
| 2013/0222133 A1 | 8/2013 | Schultz et al. | |
| 2015/0105096 A1* | 4/2015 | Chowdhury | H04W 4/021 455/456.1 |

FOREIGN PATENT DOCUMENTS

| | | |
|---|---|---|
| EP | 2464149 A1 | 6/2012 |
| JP | 2012108704 A | 6/2012 |
| JP | 5571120 B2 | 8/2014 |
| WO | WO 9415412 A1 | 7/1994 |
| WO | WO 9808314 A1 | 2/1998 |
| WO | WO 2014/025563 A1 | 2/2014 |

* cited by examiner

DETERMINING AN ACCURACY OF A LOCATION DETERMINATION

TECHNICAL FIELD

The technical field generally relates to determining the accuracy of a location determination, and more specifically relates to determining the accuracy of a location determination via a communications device.

BACKGROUND

The Federal Communications Commission (FCC) requires that E911 mobile location accuracy be tested. This typically may be accomplished by driving test motor vehicles along predefined routes. Calls may be initiated from the test vehicles and network equipment may determine the locations of the vehicles.

SUMMARY

The following presents a simplified summary that describes some aspects or configurations of the subject disclosure. This summary is provided to introduce a selection of concepts in a simplified form that are further described below in the Detailed Description. This summary is not intended to identify key features or essential features of the claimed subject matter, nor is it intended to be used to limit the scope of the claimed subject matter. This summary is not an extensive overview of the disclosure. Indeed, additional or alternative configurations of the subject disclosure may be available beyond those described in the summary.

As described herein, a communications device, such as a mobile phone or the like, may be utilized to effectuate determining the accuracy of location determination mechanisms. In an example configuration, digits and/or text being provided by a communications device may be monitored. When predetermined digits/text are detected (e.g., 9-1-1), location determination automatically may be initiated (e.g., via GPS), location information automatically may be retrieved from a register/memory of the communications device, or the like, or any appropriate combination thereof. Location information also may be stored. Time stamps may be stored with the location information. Network activity may be monitored. When activity pertaining to the device is detected, the location of the device may be determined (e.g., via other than GPS) and time stamped. The location information from the two separate determinations may be time aligned. The time aligned locations may be analyzed to determine the accuracy of one of the location determination mechanism as compared to the other.

In an example configuration, an apparatus comprises a processor and memory coupled to the processor. The memory may comprise executable instructions that when executed by the processor cause the processor to effectuate operations. The operations may comprise: detecting activity associated with a device, responsive to detecting the activity, determining, via a first location determination mechanism, a first plurality of locations of the device, determining a respective first plurality of determination times at which each location of the first plurality of locations was determined, obtaining a second plurality of locations of the device, the second plurality of locations being determined via a second location determination mechanism that differs from the first location determination mechanism, obtaining a respective second plurality of determination times at which each location of the second plurality of locations was determined, determining a first location from the first plurality of locations having a determination time that is approximately the same as a second location from the second plurality of locations, and determining a difference between the first location and the second location.

In an example configuration, a method may comprise detecting activity associated with a device, responsive to detecting the activity, determining, via a first location determination mechanism, a first plurality of locations of the device, determining a respective first plurality of determination times at which each location of the first plurality of locations was determined, obtaining a second plurality of locations of the device, the second plurality of locations being determined via a second location determination mechanism that differs from the first location determination mechanism, obtaining a respective second plurality of determination times at which each location of the second plurality of locations was determined, determining a first location from the first plurality of locations having a determination time that is approximately the same as a second location from the second plurality of locations, and determining a difference between the first location and the second location.

In an example configuration, a computer-readable storage medium may comprise executable instructions that when executed by a processor cause the processor to effectuate operations. The operations may comprise: detecting activity associated with a device, responsive to detecting the activity, determining, via a first location determination mechanism, a first plurality of locations of the device, determining a respective first plurality of determination times at which each location of the first plurality of locations was determined, obtaining a second plurality of locations of the device, the second plurality of locations being determined via a second location determination mechanism that differs from the first location determination mechanism, obtaining a respective second plurality of determination times at which each location of the second plurality of locations was determined, determining a first location from the first plurality of locations having a determination time that is approximately the same as a second location from the second plurality of locations, and determining a difference between the first location and the second location.

BRIEF DESCRIPTION OF THE DRAWINGS

Aspects of the herein disclosure are described more fully herein with reference to the accompanying drawings, in which example aspects are shown. In the following description, for purposes of explanation, numerous specific details are set forth in order to provide an understanding of the various aspects. However, the instant disclosure may be embodied in many different forms and should not be construed as limited to the example aspects set forth herein. Like numbers refer to like elements throughout.

DETAILED DESCRIPTION

As described herein, the accuracy of a location determination mechanism may be determined as compared to another location determination mechanism. In an example scenario, dialing 9-1-1 on a mobile communication device may trigger location determination of the device via a Global Positioning System (GPS)-based mechanism. The location of the device may be determined every second for 5 minutes. The location information may be time stamped to indicate the times at which the locations are being determined. The location and time information may be provided to a network. The network, upon detecting activity by the device, may determine the location of the device via network infrastructure not including GPS. The network may time stamp this second set of locations. The determination of the locations of the device via GPS and via the network infrastructure may occur approximately during the same time frame (e.g., 5 minutes). The first set of locations and the second set of locations may be time aligned, and the differences between the two sets may be utilized to determine the accuracy of network-infrastructure-based location determination mechanism as compared to the GPS-based location determination mechanism.

Figure 1:
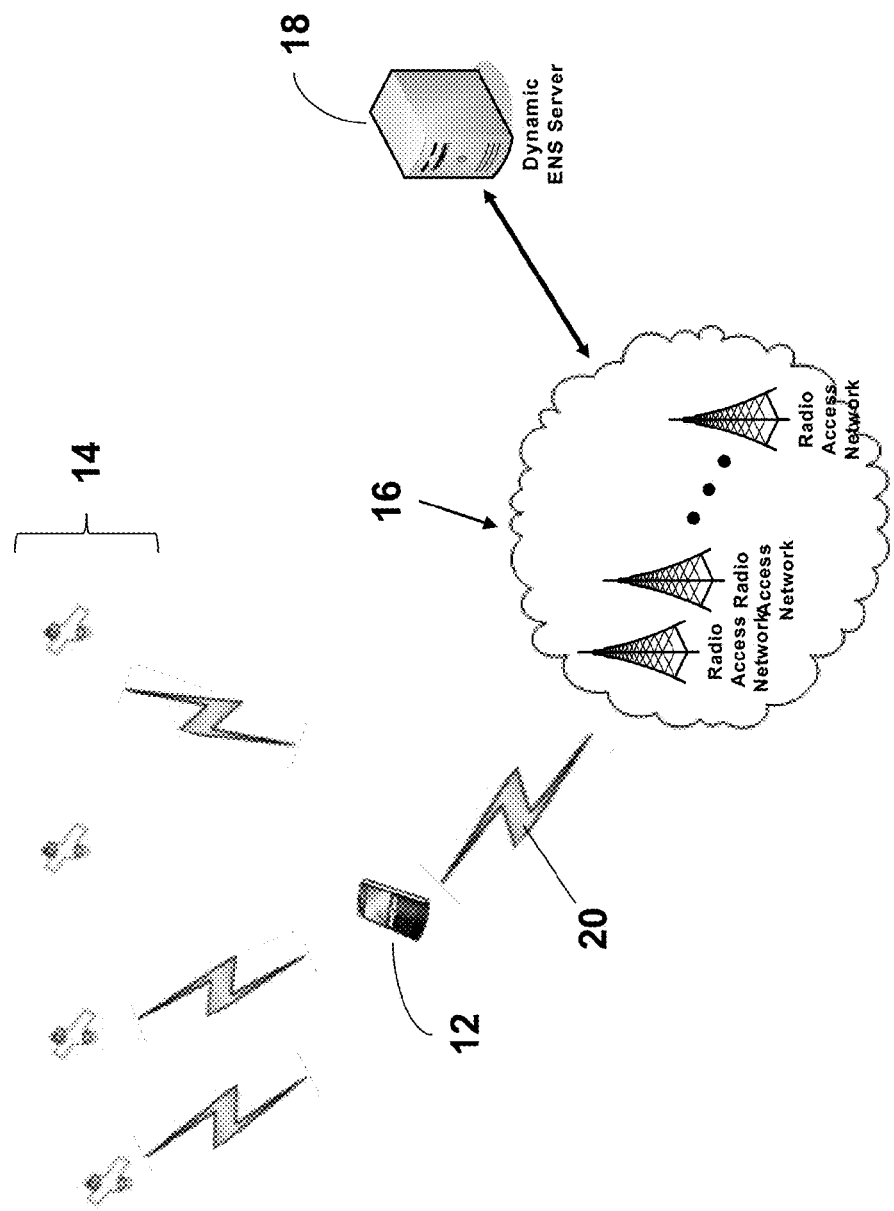
FIG. 1 is a flow diagram of an example process for determining location determination accuracy.

FIG. 1 depicts an example system and process for location determination accuracy. As described herein, a communication device 12, such as mobile communication device for example, may be configured to comprise the capability to monitor information provided via a user interface of the device and detect predetermined information. For example the characters 9-1-1 may be detected, a predetermined phone number may be detected, a predetermined string of alphanumeric characters, a predetermined pattern and/or figure (e.g. draw/write 9-1-1 on the display face of the user interface of the device 12) entered via the user interface may be detected, a switch may be depressed/activated, a voice command (e.g., speak the numbers nine-one-one), or the like, or any appropriate combination thereof.

Upon detection of predetermined information, the device 12 may initiate a location determination mechanism. For example, the device may initiate the determination of its location via the Global Positioning System (GPS) 14. Accordingly, responsive to the initiating, the location of the device may be determined. As a location is determined, it may be time stamped (associated with a time) indicating the time at which the location was determined Multiple locations and associated time stamps may be determined and stored on the device 12. In an example configuration, location and time information may be determined at time intervals. Location and time information may be determined at any appropriate time interval or combination of time intervals. For example, location and time information may be determined every second, every ½ second, every two seconds, every 5 seconds, every 30 seconds, every minute, randomly, or the like, or any appropriate combination thereof. Location and time information may be determined for any amount of time. For example, location and time information may be determined for 1 minutes, for 2 minutes, for 5 minutes, for 10 minutes, or the like. In an example configuration, location and time information may be determined every second for 5 minutes responsive to the detection of predetermined information be entered via the user interface of the device 12.

The determined location and time information may be stored. In an example configuration, determined location and time information may be stored on computer readable storage medium of device 12. The computer readable storage medium of device 12 may comprise a storage medium having a concrete, tangible, physical structure. As is known, a signal does not have a concrete, tangible, physical structure. The computer readable storage medium of device 12, as well as any computer-readable storage medium described herein, is not to be construed as a signal. The computer readable storage medium of device 12, as well as any computer-readable storage medium described herein, is not to be construed as a transient signal. Further, the computer readable storage medium of device 12, as well as any computer-readable storage medium described herein, is not to be construed as a propagating signal. The computer readable storage medium of device 12, as well as any computer-readable storage medium described herein, is to be construed as an article of manufacture having a concrete, tangible, physical structure.

At step 20, location and time information (e.g., stored location and time information) may be provided to a network 16. Location and time information may be provided in any appropriate manner. For example, location and time information may be provided, at step 20, as it is determined, location and time information may be buffered (accumulated) and buffered amounts may be provided at step 20, appropriate size chunks/bursts of the stored location and time information may be provided at step 20, or the like, or any appropriate combination thereof. In an example configuration, stored location and time information may be parsed into appropriate sized chunks, and each chunk may be provided individually, at step 20.

Identification information that identifies device 12 may be provided at step 20. Identification information may comprise any appropriate information. For example, identification information may comprises an index of International Mobile Subscriber Identities (IMSI) for device 12, identification information may comprise a serial number of device 12, identification information may comprise a model number of device 12, or the like, or any appropriate combination thereof.

Received location and time information may be stored in a server 18, or the like. The server 18 may be part of network 16, separate from network 16, or a combination thereof (server 18 may represent distributed servers as described below).

An entity, or entities, of network 16 may monitor network activity. When activity pertaining to device 12 is detected, the location of device 12 may be determined Activity pertaining to device 12 may be accomplished via the identification information provided at step 20. The location of device 12 may be determined via a location determination mechanism other than the location determination mechanism previously used to determine the location of device 12. For example, location information pertaining to device 12 may have been determined, responsive to detecting predetermined information, via a GPS-based mechanism. And, now, location information pertaining to device 12 may be determined via network infrastructure. For example, the location of device 12 may be determined via time difference of arrival calculations, configured constant location (in the case of non-moving devices), or the like, or any appropriate combination thereof.

As a location is determined via network infrastructure, it may be time stamped (associated with a time) indicating the time at which the location was determined Multiple locations and associated time stamps may be determined and stored. In an example configuration, location and time information may be determined at time intervals. Location and time information may be determined at any appropriate time interval or combination of time intervals. For example, location and time information may be determined every second, every ½ second, every two seconds, every 5 seconds, every 30 seconds, every minute, randomly, or the like, or any appropriate combination thereof. Location and time information may be determined for any amount of time. For example, location and time information may be determined for 1 minute, for 2 minutes, for 5 minutes, for 10 minutes, or the like. In an example configuration, location and time information may be determined every second for 5 minutes responsive to the detection of predetermined information be entered via the user interface of the device 12.

The location and time information determined by the first location determination mechanism (e.g., GPS) and the location and time information determined by the second location determination mechanism (e.g., network infrastructure) may be time aligned and compared. Locations determined at the same times may be identified. The locations determined at the same time may be compared to determine any differences therebetween. The accuracy of one location determination mechanism as compared to the other location determination mechanism may be determined Error distance statistics may be computed. This information may be provided (reported) for the purpose of ensuring compliance with FCC accuracy mandates, Federal Trade Commission (FTC) requirements, other federal, state, and/or local requirements, or the like, or any appropriate combination thereof.

Figure 2:
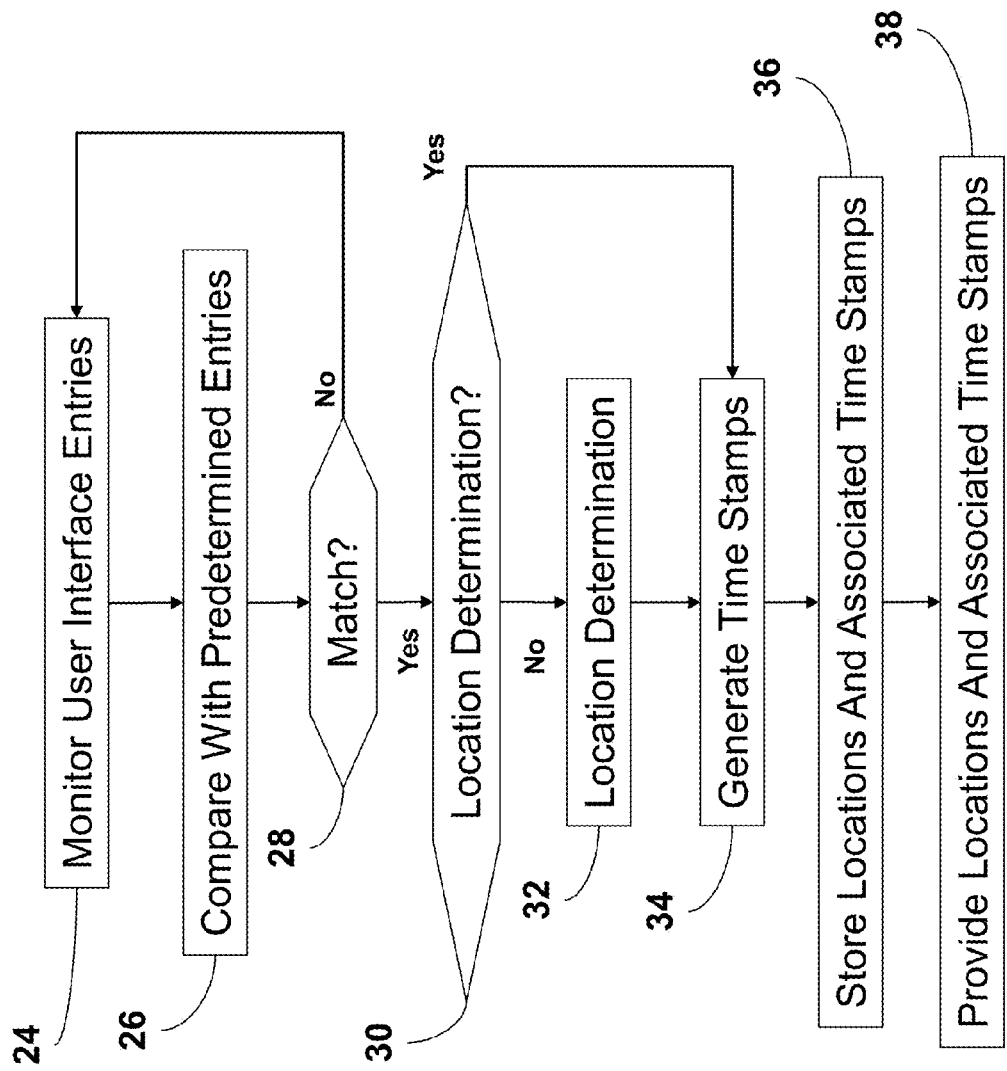
FIG. 2 is a flow diagram of an example process for determining location determination accuracy.

FIG. 2 is a flow diagram of an example process for the accuracy of a location determination. At step 24, a device may monitor user interface entries. Detected entries may be compared with predetermined entries at step 26. A predetermined entry may comprise any appropriate entry, such as, for example the characters 9-1-1, a predetermined phone number, a predetermined string of alphanumeric characters, a predetermined pattern and/or figure (e.g. draw/write 9-1-1 on the display face of the user interface of the device 12), a switch depression/activation, a predetermined voice command (e.g., speak the numbers nine-one-one), or the like, or any appropriate combination thereof.

If it is determined, at step 28, that a detected entry does not match a predetermined entry, the process depicted in FIG. 2, may proceed to step 24. If it is determined, at step 28, that a detected entry does match a predetermined entry, it may be determined, at step 30, if the location of the device already is being determined. If it is determined, at step 30, that the location of the device already is being determined, the process depicted in FIG. 2 may proceed to step 34. If it is determined, at step 30, that the location of the device is not being determined, location determination, of the device, may be initiated at step 32. Location determination may be accomplished via any appropriate mechanism. In an example configuration, location determination is effectuated, at step 32, via a GPS.

Time stamps may be generated at step 34. As a location is determined, it may be time stamped (associated with a time) indicating the time at which the location was determined. In an example configuration, location and time information may be determined at time intervals. Location and time information may be determined at any appropriate time interval or combination of time intervals. For example, location and time information may be determined every second, every ½ second, every two seconds, every 5 seconds, every 30 seconds, every minute, randomly, or the like, or any appropriate combination thereof. Location and time information may be determined for any amount of time. For example, location and time information may be determined for 1 minute, for 2 minutes, for 5 minutes, for 10 minutes, or the like. In an example configuration, location and time information may be determined every second for 5 minutes responsive to the detection of predetermined information be entered via the user interface of the device.

Multiple locations and associated time stamps may be determined and stored at step 36. In an example configuration, determined location and time information may be stored on computer readable storage medium of the device (e.g., device 12). The computer readable storage medium may comprise a storage medium having a concrete, tangible, physical structure. As is known, a signal does not have a concrete, tangible, physical structure. The computer readable storage medium, as well as any computer-readable storage medium described herein, is not to be construed as a signal. The computer readable storage medium, as well as any computer-readable storage medium described herein, is not to be construed as a transient signal. Further, the computer readable storage medium, as well as any computer-readable storage medium described herein, is not to be construed as a propagating signal. The computer readable storage medium, as well as any computer-readable storage medium described herein, is to be construed as an article of manufacture having a concrete, tangible, physical structure.

Location information and associated time information (e.g., stamps) may be provided at step 38. Location information and associated time information may be provided to any appropriate entity in any appropriate manner. For example, location and time information (e.g., stored location and time information) may be provided to a network (e.g., network 16). Location and time information may be provided in any appropriate manner. For example, location and time information may be provided, at step 38, as it is determined, location and time information may be buffered (accumulated) and buffered amounts may be provided at step 38, appropriate size chunks/bursts of the stored location and time information may be provided at step 38, or the like, or any appropriate combination thereof. In an example configuration, stored location and time information may be parsed into appropriate sized chunks, and each chunk may be provided individually, at step 38.

Identification information that identifies device 12 may be provided at step 38. Identification information may comprise any appropriate information. For example, identification information may comprise an index of International Mobile Subscriber Identities (IMSI) for the device, identification information may comprise a serial number of the device, identification information may comprise a model number of the device, or the like, or any appropriate combination thereof.

Figure 3:
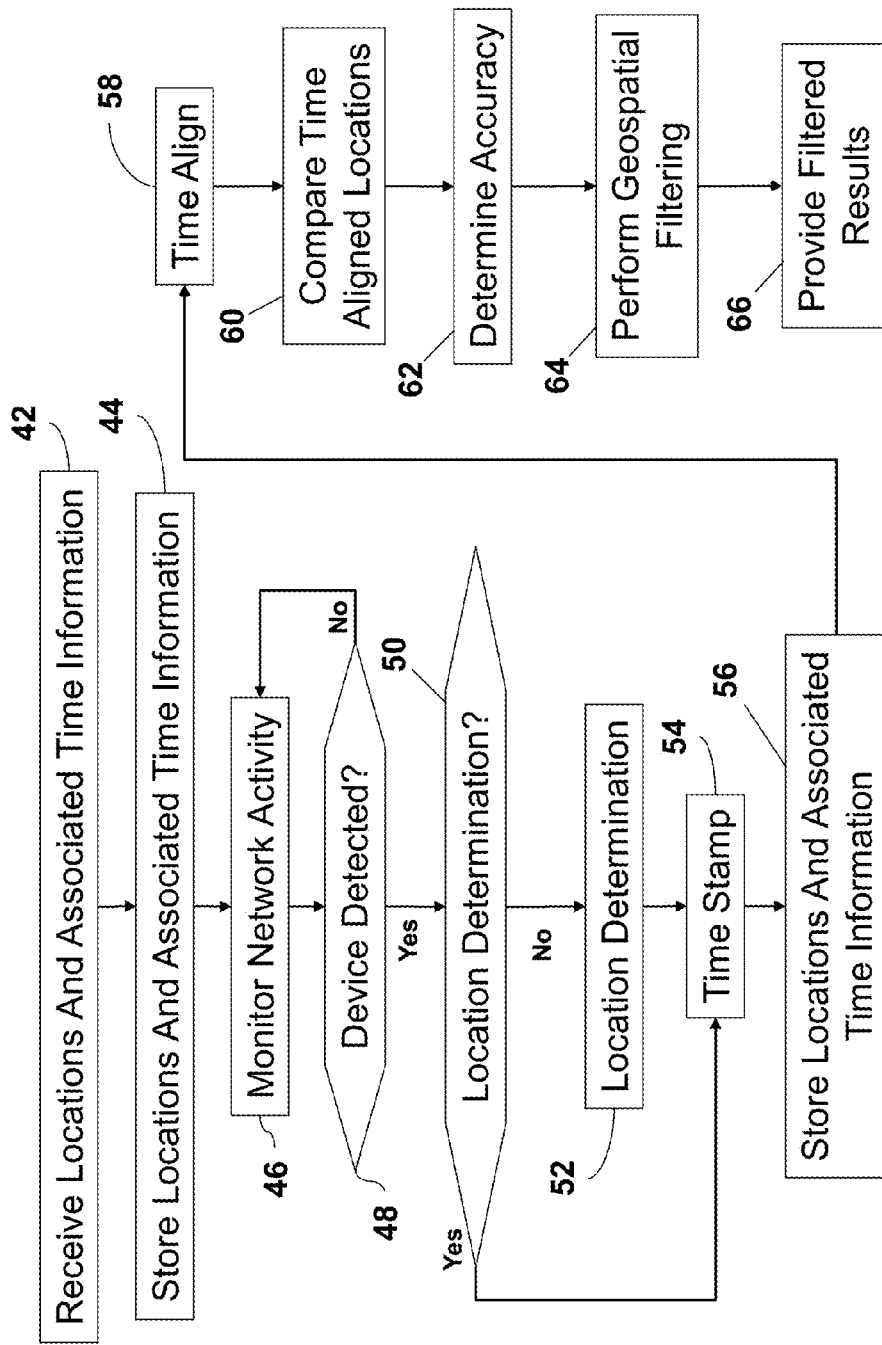
FIG. 3 is a flow diagram of another example process for determining location determination accuracy.

FIG. 3 is a flow diagram of another example process for determining location accuracy. Location and associated time information (e.g., provided at step 38) may be received at step 42. The location and associated time information may be received by any appropriate entity, such as, for example, a network, a network entity, a server, a gateway, a processor, a computer, or the like as described in more detail below, or any appropriate combination thereof. Location and time information may be received in any appropriate manner. For example, location and time information may be received, at step 42, as it is determined, location and time information may be buffered (accumulated) and buffered amounts may be received at step 42, appropriate size chunks/bursts of the stored location and time information may be received at step 42, or the like, or any appropriate combination thereof. In an example configuration, location and time information may be parsed into appropriate sized chunks, and each chunk may be received individually, at step 42.

The received location and associated time information may be stored at step 44. In an example configuration, received location and time information may be stored on computer readable storage medium of the receiving entity, or entities (e.g., server 18). The computer readable storage medium may comprise a storage medium having a concrete, tangible, physical structure. As is known, a signal does not have a concrete, tangible, physical structure. The computer readable storage medium, as well as any computer-readable storage medium described herein, is not to be construed as a signal. The computer readable storage medium, as well as any computer-readable storage medium described herein, is not to be construed as a transient signal. Further, the computer readable storage medium, as well as any computer-readable storage medium described herein, is not to be construed as a propagating signal. The computer readable storage medium, as well as any computer-readable storage medium described herein, is to be construed as an article of manufacture having a concrete, tangible, physical structure.

Network activity may be monitored at step 46. At step 48 it may be determined if a device is detected associated with location and time information. For example, network activity may be monitored at step 46 to detect activity pertaining to a device for which location and time information has been received. If no such activity is detected, the process depicted in FIG. 3 may proceed to step 46. If such activity is detected, at step 48, it may be determined, at step 50, if the location of the device already is being determined by a mechanism other than the mechanism utilized to determine locations of the information provided at step 42. For example, it may be determined, at step 50, if the location of the device is being determined via network infrastructure or the like. If it is determined, at step 50, that the location of the device already is being determined, the process depicted in FIG. 3 may proceed to step 54. If it is determined, at step 50, that the location of the device is not being determined, location determination, of the device, may be initiated at step 52. Location determination may be accomplished via any appropriate mechanism. In an example configuration, location determination may be determined via network infrastructure. For example, the location may be determined via time difference of arrival calculations, configured constant location (in the case of non-moving devices), or the like, or any appropriate combination thereof.

As a location is determined via network infrastructure, it may be time stamped (associated with a time) at step 54, indicating the time at which the location was determined Multiple locations and associated time stamps may be determined and stored. In an example configuration, location and time information may be determined at time intervals. Location and time information may be determined at any appropriate time interval or combination of time intervals. For example, location and time information may be determined every second, every ½ second, every two seconds, every 5 seconds, every 30 seconds, every minute, randomly, or the like, or any appropriate combination thereof. Location and time information may be determined for any amount of time. For example, location and time information may be determined for 1 minute, for 2 minutes, for 5 minutes, for 10 minutes, or the like. In an example configuration, location and time information may be determined every second for 5 minutes responsive to detecting activity pertaining to a device as describe with respect to steps 46 and 48.

Locations and associated time information may be stored at step 56. In an example configuration, location and time information may be stored on computer readable storage medium. The computer readable storage medium may comprise a storage medium having a concrete, tangible, physical structure. As is known, a signal does not have a concrete, tangible, physical structure. The computer readable storage medium, as well as any computer-readable storage medium described herein, is not to be construed as a signal. The computer readable storage medium, as well as any computer-readable storage medium described herein, is not to be construed as a transient signal. Further, the computer readable storage medium, as well as any computer-readable storage medium described herein, is not to be construed as a propagating signal. The computer readable storage medium, as well as any computer-readable storage medium described herein, is to be construed as an article of manufacture having a concrete, tangible, physical structure.

The location information from the two separate determinations may be time aligned at step 58. Location and time information stored at step 44 pertaining to a device activity detected at steps 46 and 48, may be time aligned with location and time information stored at step 56. The time aligned locations may be analyzed, at step 60, to determine the accuracy of one of the location determination mechanism, at step 62, as compared to the other. In an example configuration, the first set of locations (steps 42, 44) and the second set of locations (steps 50, 52, 56) may be time aligned, and the differences between the two sets may be utilized to determine the accuracy of network-infrastructure-based location determination mechanism as compared to the GPS-based location determination mechanism.

In an example configuration, geographic filtering may be performed, at step 64, to obtain a subset of the total set of accuracy results. Spatially filtered results may be provided, or stored, at step 66, to any appropriate entity.

Figure 4:
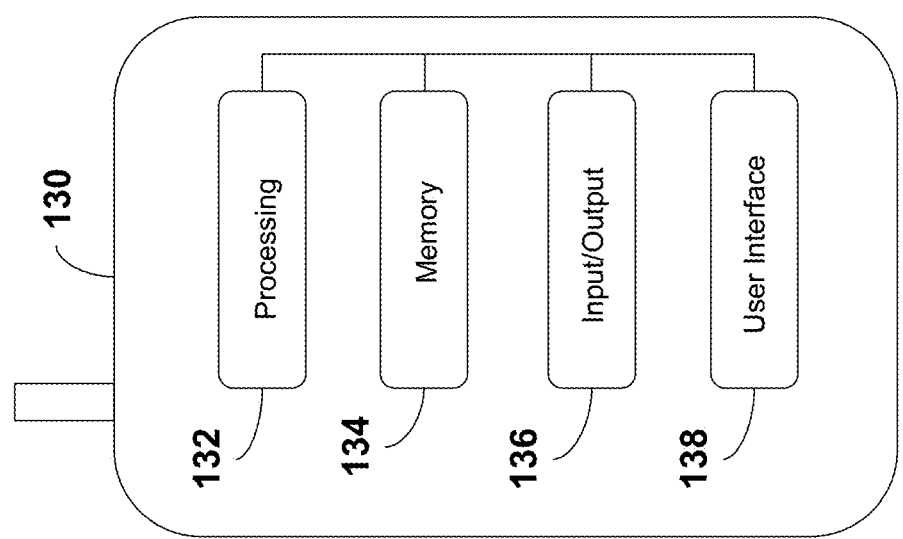
FIG. 4 is a block diagram of an example device that may be utilized to determine the accuracy of a location determination.

FIG. 4 is a block diagram of an example device 130 that may be utilized to determine the accuracy of a location determination as described herein. The device 130 may comprise and/or be incorporated into any appropriate device, examples of which may include device 12 depicted in FIG. 1, a mobile device, a mobile communications device, an end user device, a cellular phone, a portable computing device, such as a laptop, a personal digital assistant ("PDA"), a portable phone (e.g., a cell phone or the like, a smart phone, a video phone), a portable email device, a portable gaming device, a TV, a DVD player, portable media player, (e.g., a portable music player, such as an MP3 player, a Walkman, etc.), a portable navigation device (e.g., GPS compatible device, A-GPS compatible device, etc.), or a combination thereof. The device 130 may include devices that are not typically thought of as portable, such as, for example, a public computing device, a navigation device installed in-vehicle, a set top box, or the like. The mobile device 130 can include non-conventional computing devices, such as, for example, a kitchen appliance, a motor vehicle control (e.g., steering wheel), etc., or the like. As evident from the herein description, the device depicted in FIG. 4 in not to be construed as software per se. Moreover, as described herein, a user equipment, a UE, a device, a communications device, an end user device, or a mobile device is not to be construed as software per se.

The device 130 may comprise any appropriate device, mechanism, software, and/or hardware for effectuating mobility based location determination, as described herein.

In an example embodiment, the device 130 may comprise a processor and memory coupled to the processor. The memory may comprise executable instructions that when executed by the processor cause the processor to effectuate operations associated with mobility based location determination, as described herein.

In an example configuration, the device 130 may comprise a processing portion 132, a memory portion 134, an input/output portion 136, and a user interface (UI) portion 138. Each portion of the device 130 may comprise circuitry for performing functions associated with each respective portion. Thus, each portion may comprise hardware, or a combination of hardware and software. Accordingly, each portion of the device 130 is not to be construed as software per se. It is emphasized that the block diagram depiction of device 130 is exemplary and not intended to imply a specific implementation and/or configuration. For example, in an example configuration, the device 130 may comprise a cellular communications technology and the processing portion 132 and/or the memory portion 134 may be implemented, in part or in total, on a subscriber identity module (SIM) of the device 130. In another example configuration, the device 130 may comprise a laptop computer. The laptop computer may include a SIM, and various portions of the processing portion 132 and/or the memory portion 134 may be implemented on the SIM, on the laptop other than the SIM, or any combination thereof.

The processing portion 132, memory portion 134, and input/output portion 136 may be coupled together to allow communications therebetween. In various embodiments, the input/output portion 136 may comprise a receiver of the device 130, a transmitter of the device 130, or a combination thereof. The input/output portion 136 may be capable of receiving and/or providing information pertaining to mobility based location determination, as described herein. In various configurations, the input/output portion 136 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof.

The processing portion 132 may be capable of performing functions pertaining to mobility based location determination, as described herein. In a basic configuration, the device 130 may include at least one memory portion 134. The memory portion 134 may comprise a storage medium having a concrete, tangible, physical structure. As is known, a signal does not have a concrete, tangible, physical structure. The memory portion 134, as well as any computer-readable storage medium described herein, is not to be construed as a signal. The memory portion 134, as well as any computer-readable storage medium described herein, is not to be construed as a transient signal. Further, the memory portion 134, as well as any computer-readable storage medium described herein, is not to be construed as a propagating signal. The memory portion 134, as well as any computer-readable storage medium described herein, is to be construed as an article of manufacture having a concrete, tangible, physical structure.

The memory portion 134 may store any information utilized in conjunction with mobility based location determination, as described herein. Depending upon the exact configuration and type of processor, the memory portion 134 may be volatile (such as some types of RAM), non-volatile (such as ROM, flash memory, etc.), or a combination thereof. The mobile device 130 may include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the mobile device 130.

The device 130 also may contain a user interface (UI) portion 138 allowing a user to communicate with the device 130. The UI portion 138 may be capable of rendering any information utilized in conjunction with mobility based location determination, as described herein. The UI portion 138 may provide the ability to control the device 130, via, for example, buttons, soft keys, voice actuated controls, a touch screen, movement of the mobile device 130, visual cues (e.g., moving a hand in front of a camera on the mobile device 130), or the like. The UI portion 138 may provide visual information (e.g., via a display), audio information (e.g., via speaker), mechanically (e.g., via a vibrating mechanism), or a combination thereof. In various configurations, the UI portion 138 may comprise a display, a touch screen, a keyboard, an accelerometer, a motion detector, a speaker, a microphone, a camera, a tilt sensor, or any combination thereof. The UI portion 138 may comprise means for inputting biometric information, such as, for example, fingerprint information, retinal information, voice information, and/or facial characteristic information.

The UI portion 138 may include a display for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

In some embodiments, the UI portion may comprise a user interface (UI) application. The UI application may interface with a client or operating system (OS) to, for example, facilitate user interaction with device functionality and data. The UI application may aid a user to facilitate mobility based location determination, as described herein. The UI application may aid a user in entering message content, viewing received messages, answering/initiating calls, entering/deleting data, entering and setting user IDs and passwords, configuring settings, manipulating content and/or settings, interacting with other applications, or the like, and may aid the user in inputting selections associated with discovering, negotiating, sharing, and/or exchanging information and/or capabilities.

Figure 5:
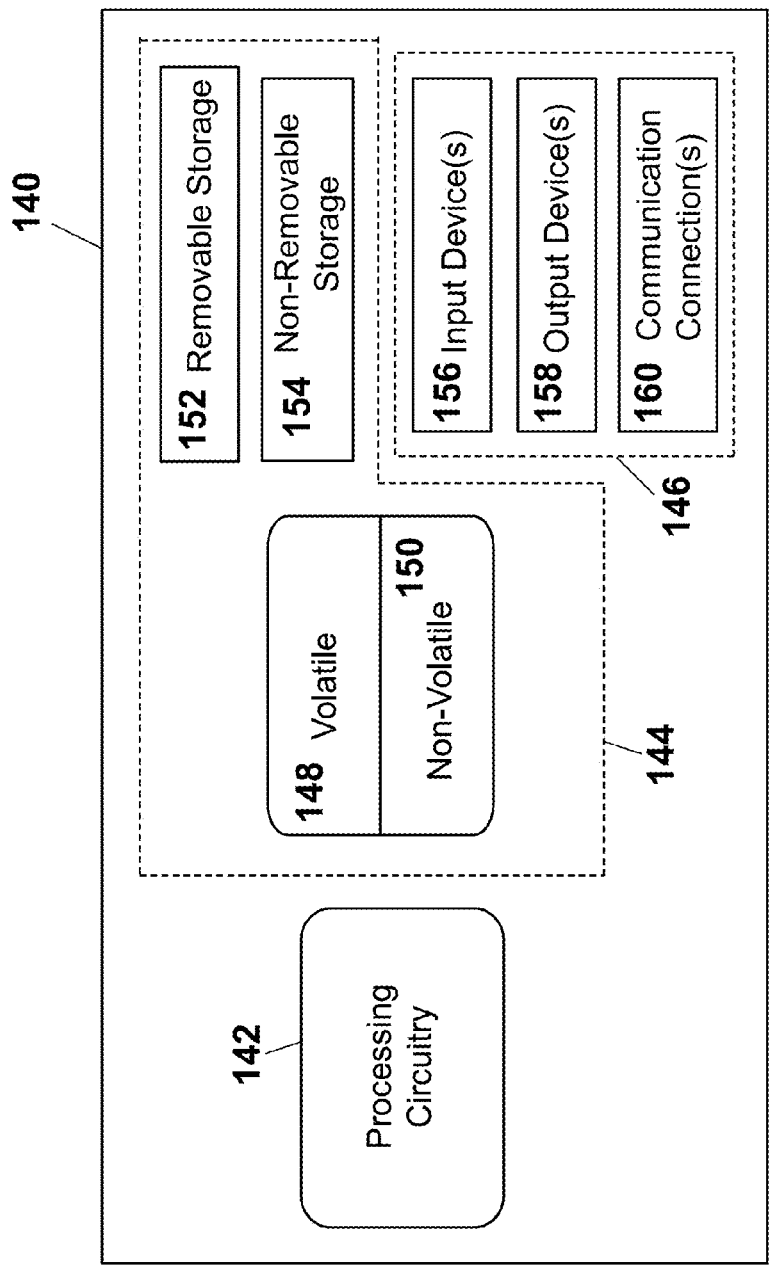
FIG. 5 is a block diagram of network entity of a communication network which may be utilized to determine the accuracy of a location determination.

FIG. 5 is a block diagram of network entity of a communication network which may be utilized determine the accuracy of a location determination as described herein. The network entity 140 may comprise hardware or a combination of hardware and software. In an example embodiment, the functionality to facilitate mobility based location determination, as described herein, may reside in any one or combination of network entities. The network entity 140 depicted in FIG. 5 may represent and perform functionality of any appropriate network entity, or combination of network entities, such as, for example, server 18 depicted in FIG. 1, any component or combination of components of network 16 of FIG. 1, a component or various components of a cellular broadcast system wireless network, a processor, a server, a gateway, a node, a MSC, a SMSC, an ALFS, a GMLC, a RAN, a SMLC, or the like, or any appropriate combination thereof. It is emphasized that the block diagram depicted in FIG. 5 is exemplary and not intended to imply a specific implementation or configuration. Thus, the network entity 140 may be implemented in a single device or multiple devices (e.g., single server or multiple servers, single gateway or multiple gateways, single controller or multiple controllers, etc.). Multiple network entities may be distributed or centrally located. Multiple network entities may communicate wirelessly, via hard wire, or any appropriate combination thereof.

In an example embodiment, the network entity 140 may comprise a processor and memory coupled to the processor. The memory may comprise executable instructions that when executed by the processor cause the processor to effectuate operations associated with mobility based location determination, as described herein. As evident from the herein description, the network entity 140 is not to be construed as software per se.

In an example configuration, the network entity 140 may comprise a processing portion 142, a memory portion 144, and an input/output portion 146. The processing portion 142, memory portion 144, and input/output portion 146 may be coupled together (coupling not shown in FIG. 5) to allow communications therebetween. Each portion of the network entity 140 may comprise circuitry for performing functions associated with each respective portion. Thus, each portion may comprise hardware, or a combination of hardware and software. Accordingly, each portion of the network entity 140 is not to be construed as software per se. The input/output portion 146 may be capable of receiving and/or providing information from/to a communications device and/or other network entities configured for mobility based location determination, as described herein. For example, the input/output portion 146 may include a wireless communications (e.g., 2.5G/3G/4G/5G/GPS) card. The input/output portion 146 may be capable of receiving and/or sending video information, audio information, control information, image information, data, or any combination thereof. In an example embodiment, the input/output portion 146 may be capable of receiving and/or sending information to determine a location of the network entity 140 and/or the communications network entity 140. In an example configuration, the input\output portion 146 may comprise a GPS receiver. In an example configuration, the network entity 140 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 146 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, or the like, or a combination thereof.

The processing portion 142 may be capable of performing functions associated with mobility based location determination, as described herein. For example, the processing portion 142 may be capable of, in conjunction with any other portion of the network entity 140, installing an application for mobility based location determination, as described herein.

In a basic configuration, the network entity 140 may include at least one memory portion 144. The memory portion 144 may comprise a storage medium having a concrete, tangible, physical structure. As is known, a signal does not have a concrete, tangible, physical structure. The memory portion 144, as well as any computer-readable storage medium described herein, is not to be construed as a signal. The memory portion 144, as well as any computer-readable storage medium described herein, is not to be construed as a transient signal. The memory portion 144, as well as any computer-readable storage medium described herein, is not to be construed as a propagating signal. The memory portion 144, as well as any computer-readable storage medium described herein, is to be construed as an article of manufacture having a concrete, tangible, physical structure.

The memory portion 144 may store any information utilized in conjunction with mobility based location determination, as described herein. Depending upon the exact configuration and type of processor, the memory portion 144 may be volatile 148 (such as some types of RAM), non-volatile 150 (such as ROM, flash memory, etc.), or a combination thereof. The network entity 140 may include additional storage (e.g., removable storage 152 and/or non-removable storage 154) including, for example, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the network entity 140.

The network entity 140 also may contain communications connection(s) 160 that allow the network entity 140 to communicate with other devices, network entities, or the like. A communications connection(s) may comprise communication media. Communication media typically embody computer readable instructions, data structures, program modules or other data in a modulated data signal such as a carrier wave or other transport mechanism and includes any information delivery media. By way of example, and not limitation, communication media may include wired media such as a wired network or direct-wired connection, and wireless media such as acoustic, RF, infrared, and other wireless media. The term computer readable media as used herein includes both storage media and communication media. The network entity 140 also may include input device(s) 156 such as keyboard, mouse, pen, voice input device, touch input device, etc. Output device(s) 158 such as a display, speakers, printer, etc. also may be included.

Mobility based location determination may be utilized in conjunction with various telecommunications networks. Some of which are described below.

Figure 6:
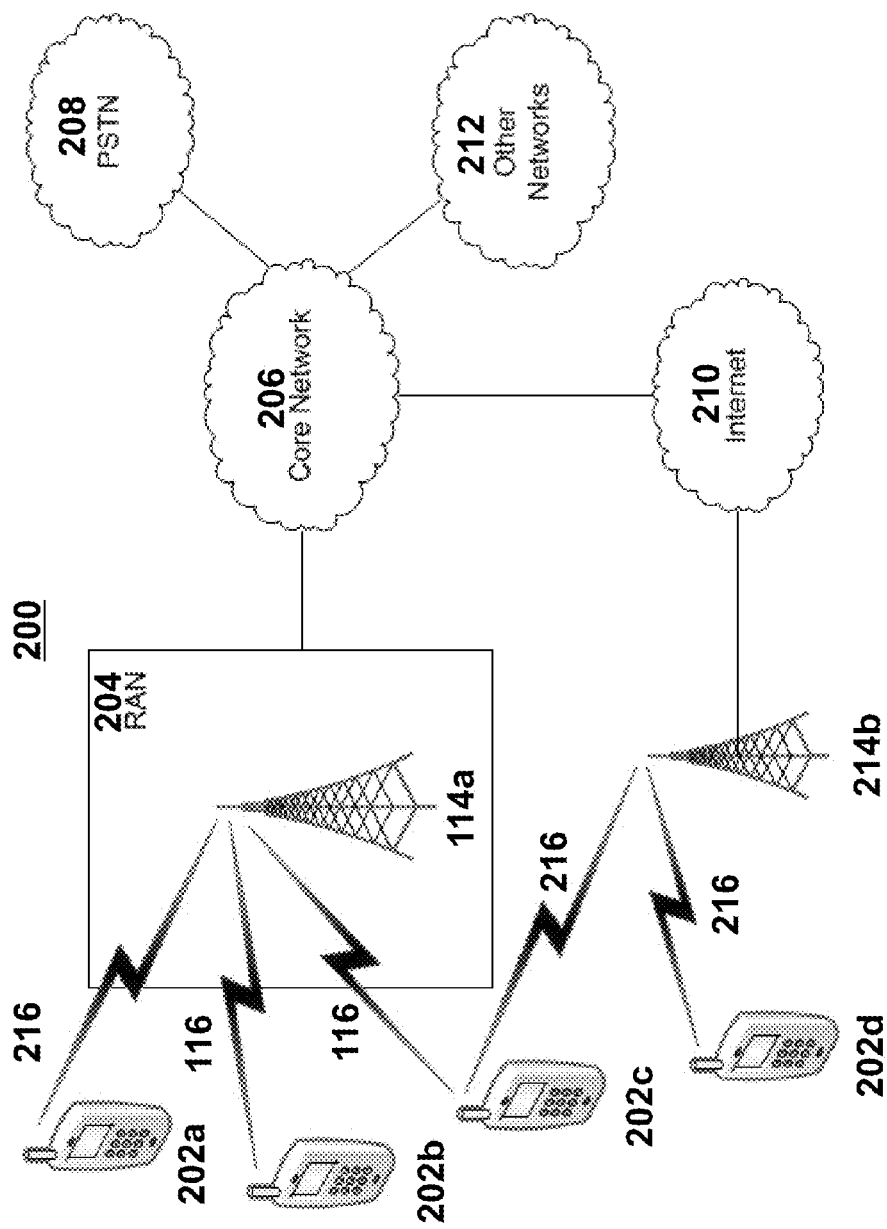
FIG. 6 is a diagram of an example communications system that may be utilized to determine the accuracy of a location determination.

FIG. 6 is a diagram of an example communications system that may be utilized to determine the accuracy of a location determination, as described herein. The communications system 200 may be a multiple access system that provides content, such as voice, data, video, messaging, broadcast, etc., to multiple wireless users. The communications system 200 may enable multiple wireless users to access such content through the sharing of system resources, including wireless bandwidth. For example, the communications systems 200 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 6 may also be referred to herein as a network.

As shown in FIG. 6, the communications system 200 may include wireless transmit/receive units (WTRUs) 202a, 202b, 202c, 202d, a radio access network (RAN) 204, a core network 206, a public switched telephone network (PSTN) 208, the Internet 210, and other networks 212, though it will be appreciated that the disclosed embodiments contemplate any number of WTRUs, base stations, networks, and/or network elements. Each of the WTRUs 202a, 202b, 202c, 202d may be any type of device configured to operate and/or communicate in a wireless environment. For example, a WTRU may comprise network entity 140, device 130, a UE, or the like, or any combination thereof. By way of example, the WTRUs 202a, 202b, 202c, 202d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 200 may also include a base station 214a and a base station 214b. Each of the base stations 214a, 214b may be any type of device configured to wirelessly interface with at least one of the WTRUs 202a, 202b, 202c, 202d to facilitate access to one or more communication networks, such as the core network 206, the Internet 210, and/or the networks 212. By way of example, the base stations 214a, 214b may be a base transceiver station (BTS), a Node-B, an eNode B, a Home Node B, a Home eNode B, a site controller, an access point (AP), a wireless router, and the like. While the base stations 214a, 214b are each depicted as a single element, it will be appreciated that the base stations 214a, 214b may include any number of interconnected base stations and/or network elements.

The base station 214a may be part of the RAN 204, which may also include other base stations and/or network elements (not shown), such as a base station controller (BSC), a radio network controller (RNC), relay nodes, etc. The base station 214a and/or the base station 214b may be configured to transmit and/or receive wireless signals within a particular geographic region, which may be referred to as a cell (not shown). The cell may further be divided into cell sectors. For example, the cell associated with the base station 214a may be divided into three sectors. Thus, in an embodiment, the base station 214a may include three transceivers, i.e., one for each sector of the cell. In another embodiment, the base station 214a may employ multiple-input multiple output (MIMO) technology and, therefore, may utilize multiple transceivers for each sector of the cell.

The base stations 214a, 214b may communicate with one or more of the WTRUs 202a, 202b, 202c, 202d over an air interface 216, which may be any suitable wireless communication link (e.g., radio frequency (RF), microwave, infrared (IR), ultraviolet (UV), visible light, etc.). The air interface 216 may be established using any suitable radio access technology (RAT).

More specifically, as noted above, the communications system 200 may be a multiple access system and may employ one or more channel access schemes, such as CDMA, TDMA, FDMA, OFDMA, SC-FDMA, and the like. For example, the base station 214a in the RAN 204 and the WTRUs 202a, 202b, 202c may implement a radio technology such as Universal Mobile Telecommunications System (UMTS) Terrestrial Radio Access (UTRA) that may establish the air interface 216 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 214a and the WTRUs 202a, 202b, 202c may implement a radio technology such as Evolved UMTS Terrestrial Radio Access (E-UTRA), which may establish the air interface 216 using Long Term Evolution (LTE) and/or LTE-Advanced (LTE-A).

In other embodiments, the base station 214a and the WTRUs 202a, 202b, 202c may implement radio technologies such as IEEE 802.16 (i.e., Worldwide Interoperability for Microwave Access (WiMAX)), CDMA2000, CDMA2000 2×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 214b in FIG. 6 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 214b and the WTRUs 202c, 202d may implement a radio technology such as IEEE 802.11 to establish a wireless local area network (WLAN). In another embodiment, the base station 214b and the WTRUs 202c, 202d may implement a radio technology such as IEEE 802.15 to establish a wireless personal area network (WPAN). In yet another embodiment, the base station 214b and the WTRUs 202c, 202d may utilize a cellular-based RAT (e.g., WCDMA, CDMA2000, GSM, LTE, LTE-A, etc.) to establish a picocell or femtocell. As shown in FIG. 6, the base station 214b may have a direct connection to the Internet 210. Thus, the base station 214b may not be required to access the Internet 210 via the core network 206.

The RAN 204 may be in communication with the core network 206, which may be any type of network configured to provide voice, data, applications, and/or voice over internet protocol (VoIP) services to one or more of the WTRUs 202a, 202b, 202c, 202d. For example, the core network 206 may provide call control, billing services, mobile location-based services, pre-paid calling, Internet connectivity, video distribution, etc., and/or perform high-level security functions, such as user authentication. Although not shown in FIG. 6, it will be appreciated that the RAN 204 and/or the core network 206 may be in direct or indirect communication with other RANs that employ the same RAT as the RAN 204 or a different RAT. For example, in addition to being connected to the RAN 204, which may be utilizing an E-UTRA radio technology, the core network 206 may also be in communication with another RAN (not shown) employing a GSM radio technology.

The core network 206 may also serve as a gateway for the WTRUs 202a, 202b, 202c, 202d to access the PSTN 208, the Internet 210, and/or other networks 212. The PSTN 208 may include circuit-switched telephone networks that provide plain old telephone service (POTS). The Internet 210 may include a global system of interconnected computer networks and devices that use common communication protocols, such as the transmission control protocol (TCP), user datagram protocol (UDP) and the internet protocol (IP) in the TCP/IP internet protocol suite. The networks 212 may include wired or wireless communications networks owned and/or operated by other service providers. For example, the networks 212 may include another core network connected to one or more RANs, which may employ the same RAT as the RAN 204 or a different RAT.

Some or all of the WTRUs 202a, 202b, 202c, 202d in the communications system 200 may include multi-mode capabilities, i.e., the WTRUs 202a, 202b, 202c, 202d may include multiple transceivers for communicating with different wireless networks over different wireless links. For example, the WTRU 202c shown in FIG. 6 may be configured to communicate with the base station 214a, which may employ a cellular-based radio technology, and with the base station 214b, which may employ an IEEE 802 radio technology.

Figure 7:
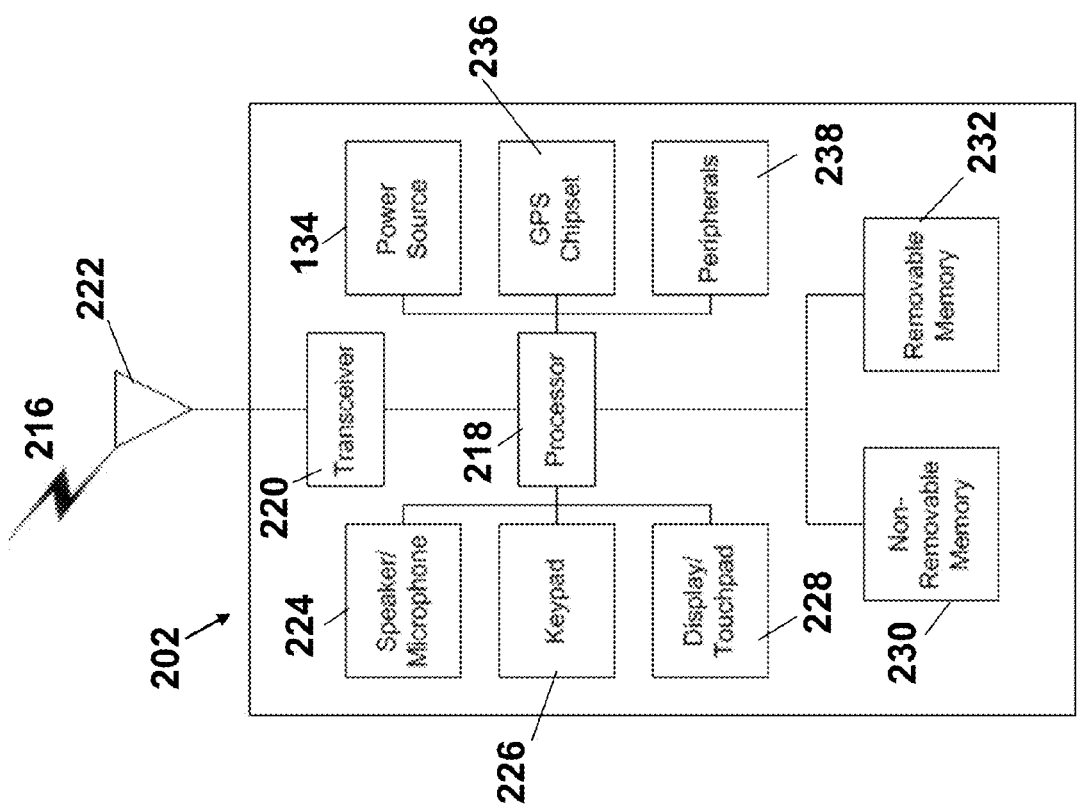
FIG. 7 is a system diagram of an example WTRU which may be utilized to determine the accuracy of a location determination.

FIG. 7 is a system diagram of an example WTRU 202 which may be utilized to determine the accuracy of a location determination, as described herein. As shown in FIG. 7, the WTRU 202 may include a processor 218, a transceiver 220, a transmit/receive element 222, a speaker/microphone 224, a keypad 226, a display/touchpad 228, non-removable memory 230, removable memory 232, a power source 234, a global positioning system (GPS) chipset 236, and other peripherals 238. It will be appreciated that the WTRU 202 may include any sub-combination of the foregoing elements while remaining consistent with an embodiment.

The processor 218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 218 may perform signal coding, data processing, power control, input/output processing, and/or any other functionality that enables the WTRU 202 to operate in a wireless environment. The processor 218 may be coupled to the transceiver 220, which may be coupled to the transmit/receive element 222. While FIG. 7 depicts the processor 218 and the transceiver 220 as separate components, it will be appreciated that the processor 218 and the transceiver 220 may be integrated together in an electronic package or chip.

The transmit/receive element 222 may be configured to transmit signals to, or receive signals from, a base station (e.g., the base station 214a) over the air interface 216. For example, in one embodiment, the transmit/receive element 222 may be an antenna configured to transmit and/or receive RF signals. In another embodiment, the transmit/receive element 222 may be an emitter/detector configured to transmit and/or receive IR, UV, or visible light signals, for example. In yet another embodiment, the transmit/receive element 222 may be configured to transmit and receive both RF and light signals. It will be appreciated that the transmit/receive element 222 may be configured to transmit and/or receive any combination of wireless signals.

In addition, although the transmit/receive element 222 is depicted in FIG. 7 as a single element, the WTRU 202 may include any number of transmit/receive elements 222. More specifically, the WTRU 202 may employ MIMO technology. Thus, in one embodiment, the WTRU 202 may include two or more transmit/receive elements 222 (e.g., multiple antennas) for transmitting and receiving wireless signals over the air interface 216.

The transceiver 220 may be configured to modulate the signals that are to be transmitted by the transmit/receive element 222 and to demodulate the signals that are received by the transmit/receive element 222. As noted above, the WTRU 202 may have multi-mode capabilities. Thus, the transceiver 220 may include multiple transceivers for enabling the WTRU 202 to communicate via multiple RATs, such as UTRA and IEEE 802.11, for example.

The processor 218 of the WTRU 202 may be coupled to, and may receive user input data from, the speaker/microphone 224, the keypad 226, and/or the display/touchpad 228 (e.g., a liquid crystal display (LCD) display unit or organic light-emitting diode (OLED) display unit). The processor 218 may also output user data to the speaker/microphone 224, the keypad 226, and/or the display/touchpad 228. In addition, the processor 218 may access information from, and store data in, any type of suitable memory, such as the non-removable memory 230 and/or the removable memory 232. The non-removable memory 230 may include random-access memory (RAM), read-only memory (ROM), a hard disk, or any other type of memory storage device. The removable memory 232 may include a subscriber identity module (SIM) card, a memory stick, a secure digital (SD) memory card, and the like. In other embodiments, the processor 218 may access information from, and store data in, memory that is not physically located on the WTRU 202, such as on a server or a home computer (not shown).

The processor 218 may receive power from the power source 234, and may be configured to distribute and/or control the power to the other components in the WTRU 202. The power source 234 may be any suitable device for powering the WTRU 202. For example, the power source 234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 218 may also be coupled to the GPS chipset 236, which may be configured to provide location information (e.g., longitude and latitude) regarding the current location of the WTRU 202. In addition to, or in lieu of, the information from the GPS chipset 236, the WTRU 202 may receive location information over the air interface 216 from a base station (e.g., base stations 214a, 214b) and/or determine its location based on the timing of the signals being received from two or more nearby base stations. It will be appreciated that the WTRU 202 may acquire location information by way of any suitable location-determination method while remaining consistent with an embodiment.

The processor 218 may further be coupled to other peripherals 238, which may include one or more software and/or hardware modules that provide additional features, functionality and/or wired or wireless connectivity. For example, the peripherals 238 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8:
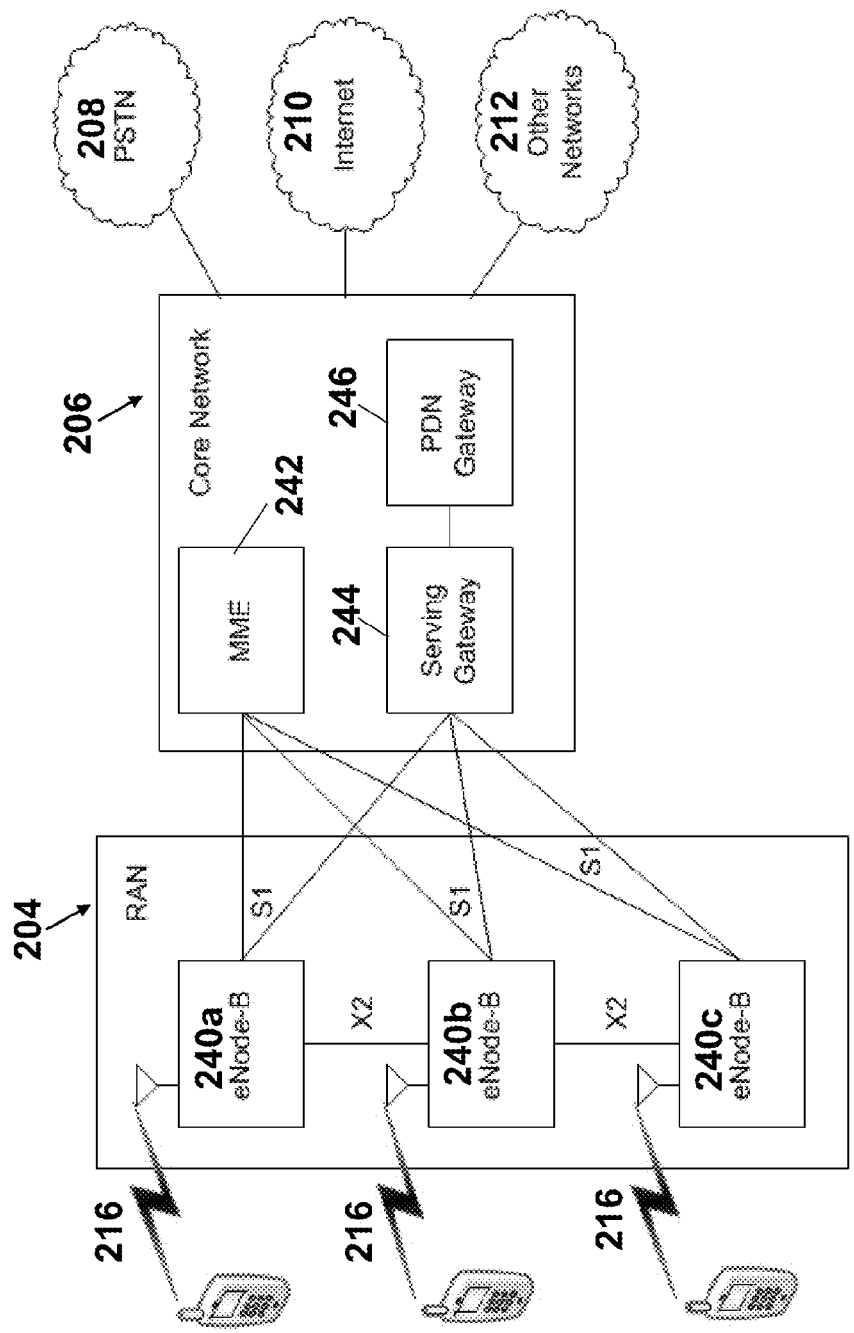
FIG. 8 is an example system diagram of RAN and a core network that may be utilized to determine the accuracy of a location determination.

FIG. 8 is an example system diagram of RAN 204 and a core network 206 that may be utilized to determine the accuracy of a location determination, as described herein. As noted above, the RAN 204 may employ an E-UTRA radio technology to communicate with the WTRUs 202a, 202b, and 202c over the air interface 216. The RAN 204 may also be in communication with the core network 206.

The RAN 204 may include eNode-Bs 240a, 240b, 240c, though it will be appreciated that the RAN 204 may include any number of eNode-Bs while remaining consistent with an embodiment. The eNode-Bs 240a, 240b, 240c may each include one or more transceivers for communicating with the WTRUs 202a, 202b, 202c over the air interface 216. In one embodiment, the eNode-Bs 240a, 240b, 240c may implement MIMO technology. Thus, the eNode-B 240a, for example, may use multiple antennas to transmit wireless signals to, and receive wireless signals from, the WTRU 202a.

Each of the eNode-Bs 240a, 240b, and 240c may be associated with a particular cell (not shown) and may be configured to handle radio resource management decisions, handover decisions, scheduling of users in the uplink and/or downlink, and the like. As shown in FIG. 8, the eNode-Bs 240a, 240b, 240c may communicate with one another over an X2 interface.

The core network 206 shown in FIG. 8 may include a mobility management gateway or entity (MME) 242, a serving gateway 244, and a packet data network (PDN) gateway 246. While each of the foregoing elements are depicted as part of the core network 206, it will be appreciated that any one of these elements may be owned and/or operated by an entity other than the core network operator.

The MME 242 may be connected to each of the eNode-Bs 240a, 240b, 240c in the RAN 204 via an S1 interface and may serve as a control node. For example, the MME 242 may be responsible for authenticating users of the WTRUs 202a, 202b, 202c, bearer activation/deactivation, selecting a particular serving gateway during an initial attach of the WTRUs 202a, 202b, 202c, and the like. The MME 242 may also provide a control plane function for switching between the RAN 204 and other RANs (not shown) that employ other radio technologies, such as GSM or WCDMA.

The serving gateway 244 may be connected to each of the eNode-Bs 240a, 240b, and 240c in the RAN 204 via the S1 interface. The serving gateway 244 may generally route and forward user data packets to/from the WTRUs 202a, 202b, 202c. The serving gateway 244 may also perform other functions, such as anchoring user planes during inter-eNode B handovers, triggering paging when downlink data is available for the WTRUs 202a, 202b, 202c, managing and storing contexts of the WTRUs 202a, 202b, 202c, and the like.

The serving gateway 244 may also be connected to the PDN gateway 246, which may provide the WTRUs 202a, 202b, 202c with access to packet-switched networks, such as the Internet 210, to facilitate communications between the WTRUs 202a, 202b, 202c and IP-enabled devices.

The core network 206 may facilitate communications with other networks. For example, the core network 206 may provide the WTRUs 202a, 202b, 202c with access to circuit-switched networks, such as the PSTN 208, to facilitate communications between the WTRUs 202a, 202b, 202c and traditional land-line communications devices. For example, the core network 206 may include, or may communicate with, an IP gateway (e.g., an IP multimedia subsystem (IMS) server) that serves as an interface between the core network 206 and the PSTN 208. In addition, the core network 206 may provide the WTRUs 202a, 202b, 202c with access to the networks 212, which may include other wired or wireless networks that are owned and/or operated by other service providers.

Figure 9:
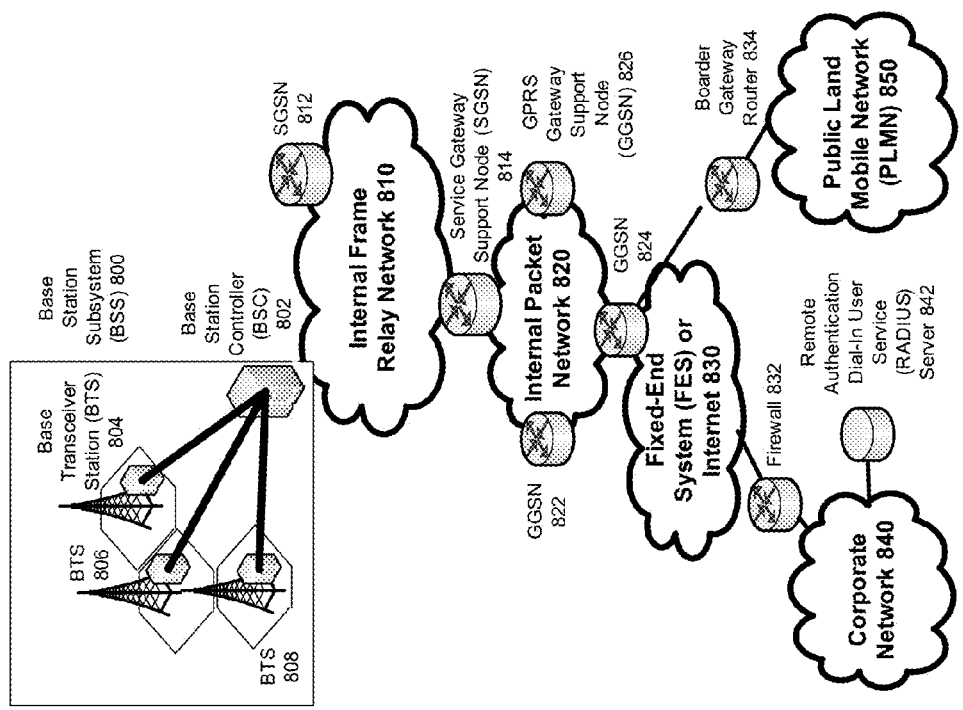
FIG. 9 depicts an overall block diagram of an example packet-based mobile cellular network environment, such as a GPRS network, that may be utilized to determine the accuracy of a location determination.

FIG. 9 depicts an overall block diagram of an example packet-based mobile cellular network environment, such as a GPRS network, that may be utilized to determine the accuracy of a location determination, as described herein. In the example packet-based mobile cellular network environment shown in FIG. 9, there are a plurality of Base Station Subsystems ("BSS") 800 (only one is shown), each of which comprises a Base Station Controller ("BSC") 802 serving a plurality of Base Transceiver Stations ("BTS") such as BTSs 804, 806, and 808. BTSs 804, 806, 808, etc. are the access points where users of packet-based mobile devices become connected to the wireless network. In example fashion, the packet traffic originating from user devices is transported via an over-the-air interface to a BTS 808, and from the BTS 808 to the BSC 802. Base station subsystems, such as BSS 800, are a part of internal frame relay network 810 that can include Service GPRS Support Nodes ("SGSN") such as SGSN 812 and 814. Each SGSN is connected to an internal packet network 820 through which a SGSN 812, 814, etc. can route data packets to and from a plurality of gateway GPRS support nodes (GGSN) 822, 824, 826, etc. As illustrated, SGSN 814 and GGSNs 822, 824, and 826 are part of internal packet network 820. Gateway GPRS serving nodes 822, 824 and 826 mainly provide an interface to external Internet Protocol ("IP") networks such as Public Land Mobile Network ("PLMN") 850, corporate intranets 840, or Fixed-End System ("FES") or the public Internet 830. As illustrated, subscriber corporate network 840 may be connected to GGSN 824 via firewall 832; and PLMN 850 is connected to GGSN 824 via boarder gateway router 834. The Remote Authentication Dial-In User Service ("RADIUS") server 842 may be used for caller authentication when a user of a mobile cellular device calls corporate network 840.

Generally, there may be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Microcells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 10:
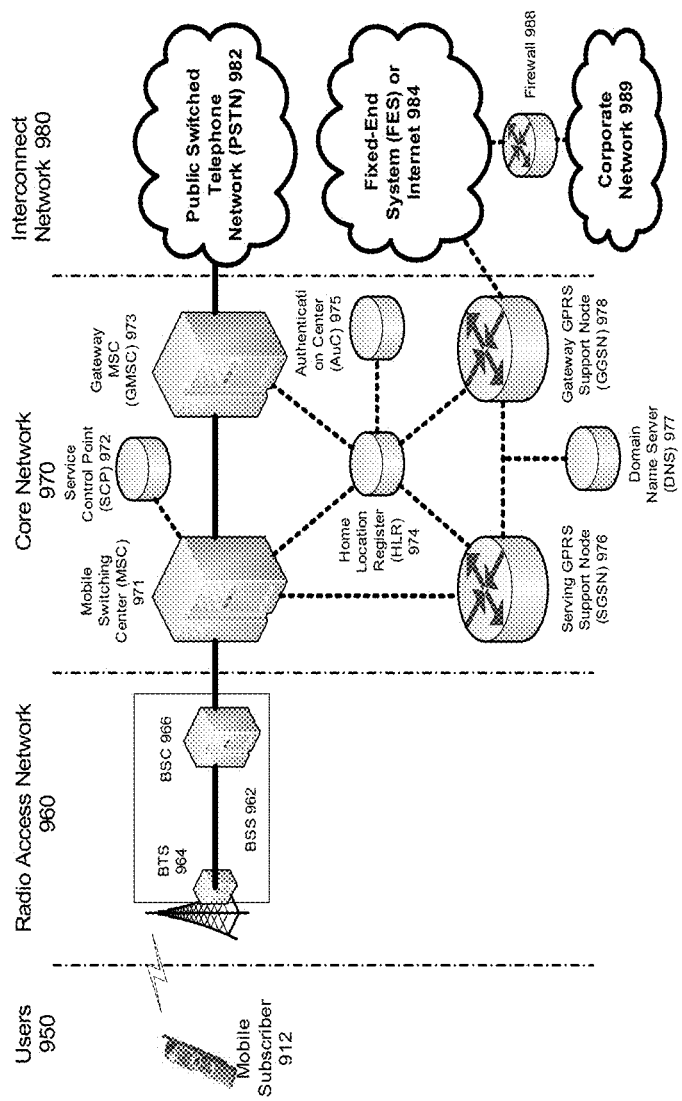
FIG. 10 illustrates an architecture of a typical GPRS network that may be utilized to determine the accuracy of a location determination.

FIG. 10 illustrates an architecture of a typical GPRS network that may be utilized to determine the accuracy of a location determination, as described herein. The architecture depicted in FIG. 10 may be segmented into four groups: users 950, radio access network 960, core network 970, and interconnect network 980. Users 950 comprise a plurality of end users. Note, device 912 is referred to as a mobile subscriber in the description of network shown in FIG. 10. In an example embodiment, the device depicted as mobile subscriber 912 comprises a communications device (e.g., communications device 130). Radio access network 960 comprises a plurality of base station subsystems such as BSSs 962, which include BTSs 964 and BSCs 966. Core network 970 comprises a host of various network elements. As illustrated in FIG. 10, core network 970 may comprise Mobile Switching Center ("MSC") 971, Service Control Point ("SCP") 972, gateway MSC 973, SGSN 976, Home Location Register ("HLR") 974, Authentication Center ("AuC") 975, Domain Name Server ("DNS") 977, and GGSN 978. Interconnect network 980 also comprises a host of various networks and other network elements. As illustrated in FIG. 10, interconnect network 980 comprises Public Switched Telephone Network ("PSTN") 982, Fixed-End System ("FES") or Internet 984, firewall 988, and Corporate Network 989.

A mobile switching center can be connected to a large number of base station controllers. At MSC 971, for instance, depending on the type of traffic, the traffic may be separated in that voice may be sent to Public Switched Telephone Network ("PSTN") 982 through Gateway MSC ("GMSC") 973, and/or data may be sent to SGSN 976, which then sends the data traffic to GGSN 978 for further forwarding.

When MSC 971 receives call traffic, for example, from BSC 966, it sends a query to a database hosted by SCP 972. The SCP 972 processes the request and issues a response to MSC 971 so that it may continue call processing as appropriate.

The HLR 974 is a centralized database for users to register to the GPRS network. HLR 974 stores static information about the subscribers such as the International Mobile Subscriber Identity ("IMSI"), subscribed services, and a key for authenticating the subscriber. HLR 974 also stores dynamic subscriber information such as the current location of the mobile subscriber. Associated with HLR 974 is AuC 975. AuC 975 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 10, when mobile subscriber 912 initiates the attach process by turning on the network capabilities of the mobile device, an attach request is sent by mobile subscriber 912 to SGSN 976. The SGSN 976 queries another SGSN, to which mobile subscriber 912 was attached before, for the identity of mobile subscriber 912. Upon receiving the identity of mobile subscriber 912 from the other SGSN, SGSN 976 requests more information from mobile subscriber 912. This information is used to authenticate mobile subscriber 912 to SGSN 976 by HLR 974. Once verified, SGSN 976 sends a location update to HLR 974 indicating the change of location to a new SGSN, in this case SGSN 976. HLR 974 notifies the old SGSN, to which mobile subscriber 912 was attached before, to cancel the location process for mobile subscriber 912. HLR 974 then notifies SGSN 976 that the location update has been performed. At this time, SGSN 976 sends an Attach Accept message to mobile subscriber 912, which in turn sends an Attach Complete message to SGSN 976.

After attaching itself with the network, mobile subscriber 912 then goes through the authentication process. In the authentication process, SGSN 976 sends the authentication information to HLR 974, which sends information back to SGSN 976 based on the user profile that was part of the user's initial setup. The SGSN 976 then sends a request for authentication and ciphering to mobile subscriber 912. The mobile subscriber 912 uses an algorithm to send the user identification (ID) and password to SGSN 976. The SGSN 976 uses the same algorithm and compares the result. If a match occurs, SGSN 976 authenticates mobile subscriber 912.

Next, the mobile subscriber 912 establishes a user session with the destination network, corporate network 989, by going through a Packet Data Protocol ("PDP") activation process. Briefly, in the process, mobile subscriber 912 requests access to the Access Point Name ("APN"), for example, UPS.com, and SGSN 976 receives the activation request from mobile subscriber 912. SGSN 976 then initiates a Domain Name Service ("DNS") query to learn which GGSN node has access to the UPS.com APN. The DNS query is sent to the DNS server within the core network 970, such as DNS 977, which is provisioned to map to one or more GGSN nodes in the core network 970. Based on the APN, the mapped GGSN 978 can access the requested corporate network 989. The SGSN 976 then sends to GGSN 978 a Create Packet Data Protocol ("PDP") Context Request message that contains necessary information. The GGSN 978 sends a Create PDP Context Response message to SGSN 976, which then sends an Activate PDP Context Accept message to mobile subscriber 912.

Once activated, data packets of the call made by mobile subscriber 912 can then go through radio access network 960, core network 970, and interconnect network 980, in a particular fixed-end system or Internet 984 and firewall 988, to reach corporate network 989.

Figure 11:
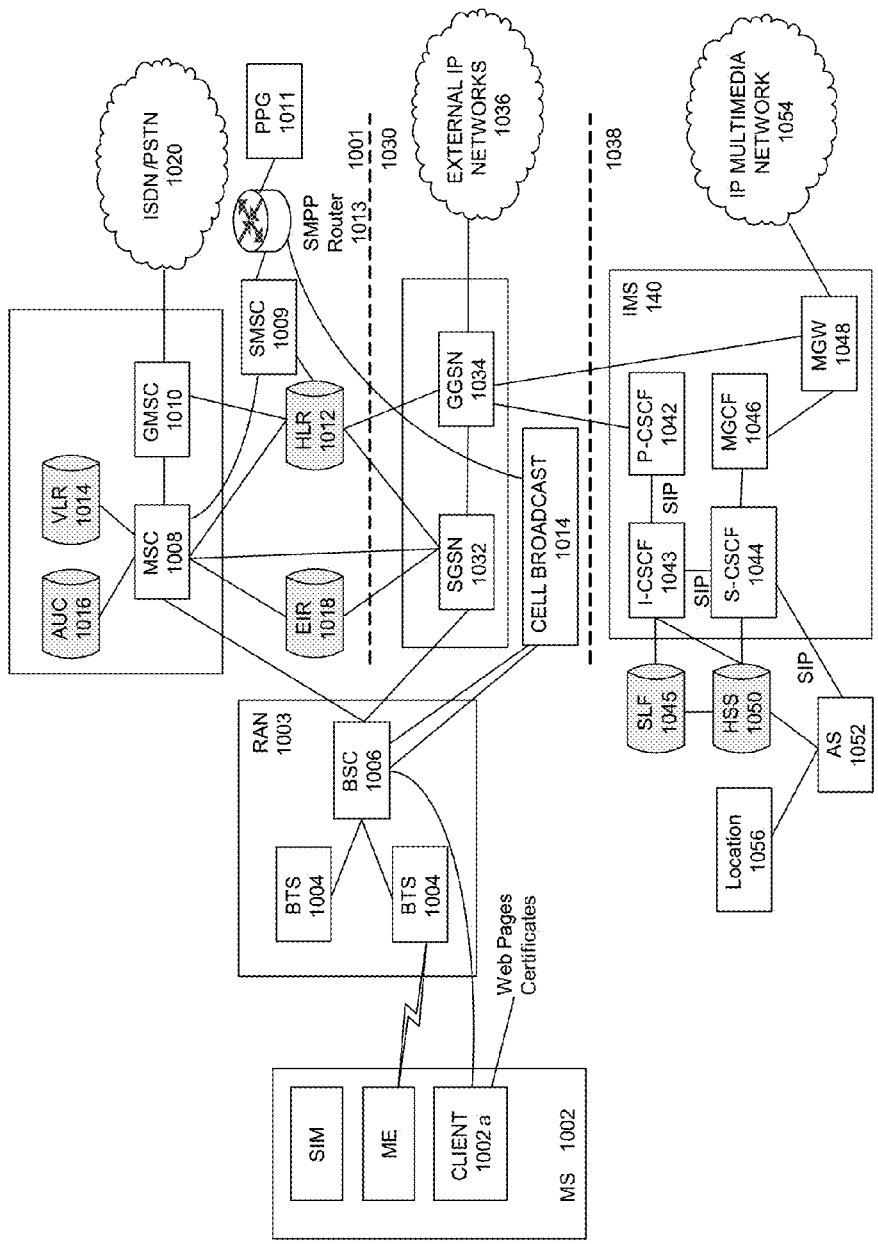
FIG. 11 illustrates an example block diagram view of a GSM/GPRS/IP multimedia network architecture that may be utilized to determine the accuracy of a location determination.

FIG. 11 illustrates an example block diagram view of a GSM/GPRS/IP multimedia network architecture that may be utilized to determine the accuracy of a location determination, as described herein. As illustrated, the architecture of FIG. 11 includes a GSM core network 1001, a GPRS network 1030 and an IP multimedia network 1038. The GSM core network 1001 includes a Mobile Station (MS) 1002, at least one Base Transceiver Station (BTS) 1004 and a Base Station Controller (BSC) 1006. The MS 1002 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1004 is physical equipment, such as a radio tower, that enables a radio interface to communicate with the MS. Each BTS may serve more than one MS. The BSC 1006 manages radio resources, including the BTS. The BSC may be connected to several BTSs. The BSC and BTS components, in combination, are generally referred to as a base station (BSS) or radio access network (RAN) 1003.

The GSM core network 1001 also includes a Mobile Switching Center (MSC) 1008, a Gateway Mobile Switching Center (GMSC) 1010, a Home Location Register (HLR) 1012, Visitor Location Register (VLR) 1014, an Authentication Center (AuC) 1018, and an Equipment Identity Register (EIR) 1016. The MSC 1008 performs a switching function for the network. The MSC also performs other functions, such as registration, authentication, location updating, handovers, and call routing. The GMSC 1010 provides a gateway between the GSM network and other networks, such as an Integrated Services Digital Network (ISDN) or Public Switched Telephone Networks (PSTNs) 1020. Thus, the GMSC 1010 provides interworking functionality with external networks.

The HLR 1012 is a database that contains administrative information regarding each subscriber registered in a corresponding GSM network. The HLR 1012 also contains the current location of each MS. The VLR 1014 is a database that contains selected administrative information from the HLR 1012. The VLR contains information necessary for call control and provision of subscribed services for each MS currently located in a geographical area controlled by the VLR. The HLR 1012 and the VLR 1014, together with the MSC 1008, provide the call routing and roaming capabilities of GSM. The AuC 1016 provides the parameters needed for authentication and encryption functions. Such parameters allow verification of a subscriber's identity. The EIR 1018 stores security-sensitive information about the mobile equipment.

A Short Message Service Center (SMSC) 1009 allows one-to-one Short Message Service (SMS) messages to be sent to/from the MS 1002. A Push Proxy Gateway (PPG) 1011 is used to "push" (i.e., send without a synchronous request) content to the MS 1002. The PPG 1011 acts as a proxy between wired and wireless networks to facilitate pushing of data to the MS 1002. A Short Message Peer to Peer (SMPP) protocol router 1013 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1002 sends a location update including its current location information to the MSC/VLR, via the BTS 1004 and the BSC 1006. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1030 is logically implemented on the GSM core network architecture by introducing two packet-switching network nodes, a serving GPRS support node (SGSN) 1032, a cell broadcast and a Gateway GPRS support node (GGSN) 1034. The SGSN 1032 is at the same hierarchical level as the MSC 1008 in the GSM network. The SGSN controls the connection between the GPRS network and the MS 1002. The SGSN also keeps track of individual MS's locations and security functions and access controls.

A Cell Broadcast Center (CBC) 14 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1034 provides a gateway between the GPRS network and a public packet network (PDN) or other IP networks 1036. That is, the GGSN provides interworking functionality with external networks, and sets up a logical link to the MS through the SGSN. When packet-switched data leaves the GPRS network, it is transferred to an external TCP-IP network 1036, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1030 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1038 was introduced with 3GPP Release 5, and includes an IP multimedia subsystem (IMS) 1040 to provide rich multimedia services to end users. A representative set of the network entities within the IMS 1040 are a call/session control function (CSCF), a media gateway control function (MGCF) 1046, a media gateway (MGW) 1048, and a master subscriber database, called a home subscriber server (HSS) 1050. The HSS 1050 may be common to the GSM network 1001, the GPRS network 1030 as well as the IP multimedia network 1038.

The IP multimedia system 1040 is built around the call/session control function, of which there are three types: an interrogating CSCF (I-CSCF) 1043, a proxy CSCF (P-CSCF) 1042, and a serving CSCF (S-CSCF) 1044. The P-CSCF 1042 is the MS's first point of contact with the IMS 1040. The P-CSCF 1042 forwards session initiation protocol (SIP) messages received from the MS to an SIP server in a home network (and vice versa) of the MS. The P-CSCF 1042 may also modify an outgoing request according to a set of rules defined by the network operator (for example, address analysis and potential modification).

The I-CSCF 1043, forms an entrance to a home network and hides the inner topology of the home network from other networks and provides flexibility for selecting an S-CSCF. The I-CSCF 1043 may contact a subscriber location function (SLF) 1045 to determine which HSS 1050 to use for the particular subscriber, if multiple HSS's 1050 are present. The S-CSCF 1044 performs the session control services for the MS 1002. This includes routing originating sessions to external networks and routing terminating sessions to visited networks. The S-CSCF 1044 also decides whether an application server (AS) 1052 is required to receive information on an incoming SIP session request to ensure appropriate service handling. This decision is based on information received from the HSS 1050 (or other sources, such as an application server 1052). The AS 1052 also communicates to a location server 1056 (e.g., a Gateway Mobile Location Center (GMLC)) that provides a position (e.g., latitude/longitude coordinates) of the MS 1002.

The HSS 1050 contains a subscriber profile and keeps track of which core network node is currently handling the subscriber. It also supports subscriber authentication and authorization functions (AAA). In networks with more than one HSS 1050, a subscriber location function provides information on the HSS 1050 that contains the profile of a given subscriber.

The MGCF 1046 provides interworking functionality between SIP session control signaling from the IMS 1040 and ISUP/BICC call control signaling from the external GSTN networks (not shown). It also controls the media gateway (MGW) 1048 that provides user-plane interworking functionality (e.g., converting between AMR- and PCM-coded voice). The MGW 1048 also communicates with other IP multimedia networks 1054.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 12:
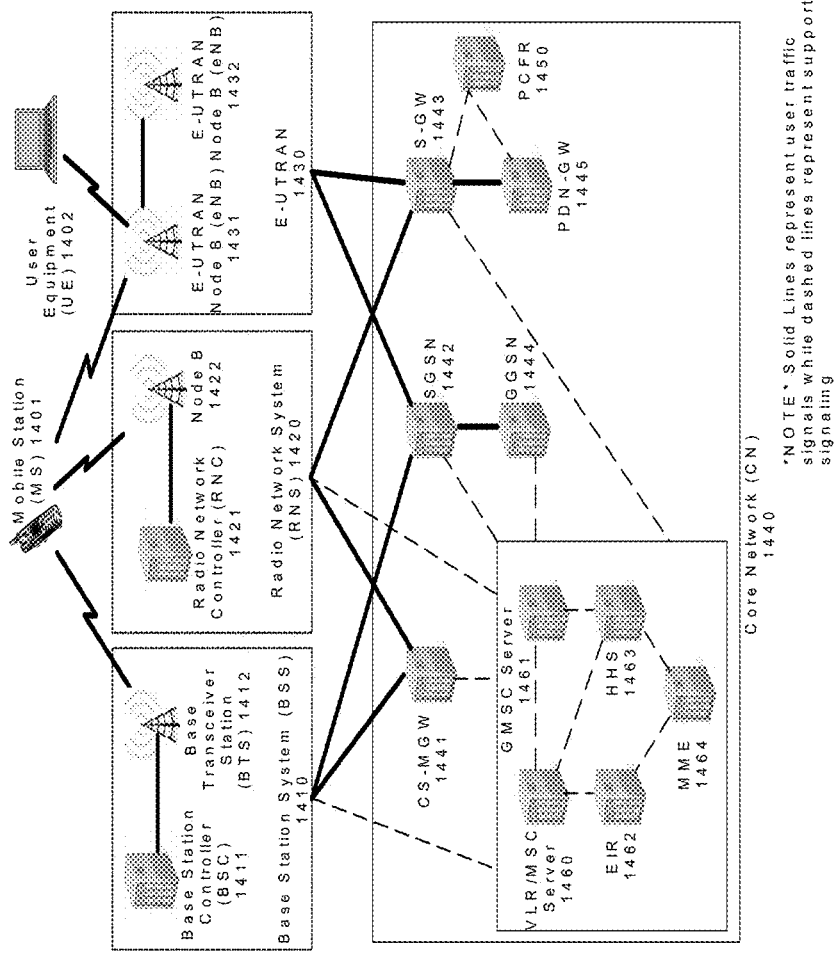
FIG. 12 illustrates a PLMN block diagram view of an example architecture that may be utilized to determine the accuracy of a location determination.

FIG. 12 illustrates a PLMN block diagram view of an example architecture that may be utilized to determine the accuracy of a location determination, as described herein. Mobile Station (MS) 1401 is the physical equipment used by the PLMN subscriber. In one illustrative embodiment, communications device 200 may serve as Mobile Station 1401. Mobile Station 1401 may be one of, but not limited to, a cellular telephone, a cellular telephone in combination with another electronic device or any other wireless mobile communication device.

Mobile Station 1401 may communicate wirelessly with Base Station System (BSS) 1410. BSS 1410 contains a Base Station Controller (BSC) 1411 and a Base Transceiver Station (BTS) 1412. BSS 1410 may include a single BSC 1411/BTS 1412 pair (Base Station) or a system of BSC/BTS pairs which are part of a larger network. BSS 1410 is responsible for communicating with Mobile Station 1401 and may support one or more cells. BSS 1410 is responsible for handling cellular traffic and signaling between Mobile Station 1401 and Core Network 1440. Typically, BSS 1410 performs functions that include, but are not limited to, digital conversion of speech channels, allocation of channels to mobile devices, paging, and transmission/reception of cellular signals.

Additionally, Mobile Station 1401 may communicate wirelessly with Radio Network System (RNS) 1420. RNS 1420 contains a Radio Network Controller (RNC) 1421 and one or more Node(s) B 1422. RNS 1420 may support one or more cells. RNS 1420 may also include one or more RNC 1421/Node B 1422 pairs or alternatively a single RNC 1421 may manage multiple Nodes B 1422. RNS 1420 is responsible for communicating with Mobile Station 1401 in its geographically defined area. RNC 1421 is responsible for controlling the Node(s) B 1422 that are connected to it and is a control element in a UMTS radio access network. RNC 1421 performs functions such as, but not limited to, load control, packet scheduling, handover control, security functions, as well as controlling Mobile Station 1401's access to the Core Network (CN) 1440.

The evolved UMTS Terrestrial Radio Access Network (E-UTRAN) 1430 is a radio access network that provides wireless data communications for Mobile Station 1401 and User Equipment 1402. E-UTRAN 1430 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1430 may include of series of logical network components such as E-UTRAN Node B (eNB) 1431 and E-UTRAN Node B (eNB) 1432. E-UTRAN 1430 may contain one or more eNBs. User Equipment 1402 may be any user device capable of connecting to E-UTRAN 1430 including, but not limited to, a personal computer, laptop, mobile device, wireless router, or other device capable of wireless connectivity to E-UTRAN 1430. The improved performance of the E-UTRAN 1430 relative to a typical UMTS network allows for increased bandwidth, spectral efficiency, and functionality including, but not limited to, voice, high-speed applications, large data transfer and IPTV, while still allowing for full mobility.

An example embodiment of a mobile data and communication service that may be implemented in the PLMN architecture described in FIG. 12 is the Enhanced Data rates for GSM Evolution (EDGE). EDGE is an enhancement for GPRS networks that implements an improved signal modulation scheme known as 8-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1401 may communicate with any or all of BSS 1410, RNS 1420, or E-UTRAN 1430. In a illustrative system, each of BSS 1410, RNS 1420, and E-UTRAN 1430 may provide Mobile Station 1401 with access to Core Network 1440. The Core Network 1440 may include of a series of devices that route data and communications between end users. Core Network 1440 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1441 is part of Core Network 1440, and interacts with Visitor Location Register (VLR) and Mobile-Services Switching Center (MSC) Server 1460 and Gateway MSC Server 1461 in order to facilitate Core Network 1440 resource control in the CS domain. Functions of CS-MGW 1441 include, but are not limited to, media conversion, bearer control, payload processing and other mobile network processing such as handover or anchoring. CS-MGW 1440 may receive connections to Mobile Station 1401 through BSS 1410, RNS 1420 or both.

Serving GPRS Support Node (SGSN) 1442 stores subscriber data regarding Mobile Station 1401 in order to facilitate network functionality. SGSN 1442 may store subscription information such as, but not limited to, the International Mobile Subscriber Identity (IMSI), temporary identities, or Packet Data Protocol (PDP) addresses. SGSN 1442 may also store location information such as, but not limited to, the Gateway GPRS Support Node (GGSN) 1444 address for each GGSN where an active PDP exists. GGSN 1444 may implement a location register function to store subscriber data it receives from SGSN 1442 such as subscription or location information.

Serving Gateway (S-GW) 1443 is an interface which provides connectivity between E-UTRAN 1430 and Core Network 1440. Functions of S-GW 1443 include, but are not limited to, packet routing, packet forwarding, transport level packet processing, event reporting to Policy and Charging Rules Function (PCRF) 1450, and mobility anchoring for inter-network mobility. PCRF 1450 uses information gathered from S-GW 1443, as well as other sources, to make applicable policy and charging decisions related to data flows, network resources and other network administration functions. Packet Data Network Gateway (PDN-GW) 1445 may provide user-to-services connectivity functionality including, but not limited to, network-wide mobility anchoring, bearer session anchoring and control, and IP address allocation for PS domain connections.

Home Subscriber Server (HSS) 1463 is a database for user information, and stores subscription data regarding Mobile Station 1401 or User Equipment 1402 for handling calls or data sessions. Networks may contain one HSS 1463 or more if additional resources are required. Example data stored by HSS 1463 include, but is not limited to, user identification, numbering and addressing information, security information, or location information. HSS 1463 may also provide call or session establishment procedures in both the PS and CS domains.

The VLR/MSC Server 1460 provides user location functionality. When Mobile Station 1401 enters a new network location, it begins a registration procedure. A MSC Server for that location transfers the location information to the VLR for the area. A VLR and MSC Server may be located in the same computing environment, as is shown by VLR/MSC Server 1460, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1401 registration or procedures for handover of Mobile Station 1401 to a different section of the Core Network 1440. GMSC Server 1461 may serve as a connection to alternate GMSC Servers for other mobile stations in larger networks.

Equipment Identity Register (EIR) 1462 is a logical element which may store the International Mobile Equipment Identities (IMEI) for Mobile Station 1401. In a typical embodiment, user equipment may be classified as either "white listed" or "black listed" depending on its status in the network. In one embodiment, if Mobile Station 1401 is stolen and put to use by an unauthorized user, it may be registered as "black listed" in EIR 1462, preventing its use on the network. Mobility Management Entity (MME) 1464 is a control node which may track Mobile Station 1401 or User Equipment 1402 if the devices are idle. Additional functionality may include the ability of MME 1464 to contact an idle Mobile Station 1401 or User Equipment 1402 if retransmission of a previous session is required.

Determining the accuracy of a location determination as describe herein may be implemented in software and/or in a combination of software and hardware, such as, for example, using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed processes.

The processor executing the computer readable or software instructions relating to the above described processes may be perceived as a programmed processor or a specialized processor.

While example configurations and aspects of determining the accuracy of a location determination have been described in connection with various computing devices/processors, the underlying concepts may be applied to any computing device, processor, or system capable of facilitating determining the accuracy of a location determination, as described herein. The various techniques described herein may be implemented in connection with hardware or software or, where appropriate, with a combination of both. Thus, the methods and apparatuses of determining the accuracy of a location determination, or certain aspects or portions thereof, may take the form of program code (i.e., instructions) embodied in tangible storage media having a concrete, tangible, physical structure. Examples of tangible storage media may include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture having a concrete, tangible, physical structure. When the program code is loaded into and executed by a machine, such as a computer, the machine becomes an apparatus for mobility based location determination, as described herein. In the case of program code executing on programmable computers, the computing device generally may include a processor, a storage medium readable by the processor (including volatile and non-volatile memory and/or storage elements), at least one input device, and at least one output device. The program(s) can be implemented in assembly or machine language, if desired. The language may be a compiled or interpreted language, and combined with hardware implementations.

The methods and apparatuses associated with determining the accuracy of a location determination, as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for determining the accuracy of a location determination, as described herein. When implemented on a general-purpose processor, the program code combines with the processor to provide a unique apparatus that operates to invoke the functionality of determining the accuracy of a location determination, as described herein.

While determining the accuracy of a location determination has been described in connection with the various embodiments of the various figures, it is to be understood that other similar embodiments may be used or modifications and additions may be made to the described embodiments of determining the accuracy of a location determination without deviating therefrom. Therefore, determining the accuracy of a location determination, as described herein, should not be limited to any single embodiment, but rather should be construed in breadth and scope in accordance with the appended claims.

What is claimed:

1. An apparatus comprising:
a processor; and
memory coupled to the processor, the memory comprising executable instructions that when executed by the processor cause the processor to effectuate operations comprising:
detecting activity associated with a device;
responsive to detecting the activity, determining, via a first location determination mechanism, a first plurality of locations of the device;

determining a respective first plurality of determination times at which each location of the first plurality of locations was determined;

obtaining a second plurality of locations of the device, the second plurality of locations being determined via a second location determination mechanism that differs from the first location determination mechanism;

obtaining a respective second plurality of determination times at which each location of the second plurality of locations was determined;

determining a first location from the first plurality of locations having a determination time that is approximately the same as a second location from the second plurality of locations; and determining a difference between the first location and the second location.

2. The apparatus of claim 1, wherein:
the second location determination mechanism comprises a Global Positioning System (GPS)-based location determination mechanism.

3. The apparatus of claim 1, wherein:
the first location determination mechanism comprises a communication-network-based location determination mechanism not comprising a Global Positioning System (GPS)-based location determination mechanism.

4. The apparatus of claim 1, the operations further comprising:
determining the first plurality of locations of the device for a predetermined amount of time at a predetermined interval.

5. The apparatus of claim 1, the operations further comprising:
determining an error statistic based on the difference between the first location and the second location.

6. The apparatus of claim 1, wherein determining the second plurality of locations of the device was initiated by detection of a predetermined entry on the device.

7. The apparatus of claim 6, wherein the predetermined entry comprising entering 9-1-1 on the device.

8. A method comprising:
detecting activity associated with a device;
responsive to detecting the activity, determining, via a first location determination mechanism, a first plurality of locations of the device;
determining a respective first plurality of determination times at which each location of the first plurality of locations was determined;
obtaining a second plurality of locations of the device, the second plurality of locations being determined via a second location determination mechanism that differs from the first location determination mechanism;
obtaining a respective second plurality of determination times at which each location of the second plurality of locations was determined;
determining a first location from the first plurality of locations having a determination time that is approximately the same as a second location from the second plurality of locations; and
determining a difference between the first location and the second location.

9. The method of claim 8, wherein:
the second location determination mechanism comprises a Global Positioning System (GPS)-based location determination mechanism.

10. The method of claim 8, wherein:
the first location determination mechanism comprises a communication-network-based location determination mechanism not comprising a Global Positioning System (GPS)-based location determination mechanism.

11. The method of claim 8, further comprising:
determining the first plurality of locations of the device for a predetermined amount of time at a predetermined interval.

12. The method of claim 8, further comprising:
determining an error statistic based on the difference between the first location and the second location.

13. The method of claim 8, wherein determining the second plurality of locations of the device was initiated by detection of a predetermined entry on the device.

14. The method of claim 13, wherein the predetermined entry comprising entering 9-1-1 on the device.

15. A computer-readable storage medium comprising executable instructions that when executed by a processor cause the processor to effectuate operations comprising:
detecting activity associated with a device;
responsive to detecting the activity, determining, via a first location determination mechanism, a first plurality of locations of the device;
determining a respective first plurality of determination times at which each location of the first plurality of locations was determined;
obtaining a second plurality of locations of the device, the second plurality of locations being determined via a second location determination mechanism that differs from the first location determination mechanism;
obtaining a respective second plurality of determination times at which each location of the second plurality of locations was determined;
determining a first location from the first plurality of locations having a determination time that is approximately the same as a second location from the second plurality of locations; and
determining a difference between the first location and the second location.

16. The computer-readable storage medium of claim 15, wherein:
the second location determination mechanism comprises a Global Positioning System (GPS)-based location determination mechanism.

17. The computer-readable storage medium of claim 15, wherein:
the first location determination mechanism comprises a communication-network-based location determination mechanism not comprising a Global Positioning System (GPS)-based location determination mechanism.

18. The computer-readable storage medium of claim 15, the operations further comprising:
determining the first plurality of locations of the device for a predetermined amount of time at a predetermined interval.

19. The computer-readable storage medium of claim 15, the operations further comprising:
determining an error statistic based on the difference between the first location and the second location.

20. The computer-readable storage medium of claim 15, wherein determining the second plurality of locations of the device was initiated by detection of a predetermined entry on the device.

* * * * *